(12) United States Patent
True et al.

(10) Patent No.: US 11,937,738 B2
(45) Date of Patent: *Mar. 26, 2024

(54) HEATING TABLE WITH ADJUSTABLE-HEIGHT GRILL

(71) Applicant: The Cashmere Caveman Co, Wild Kitchens Limited, London (GB)

(72) Inventors: Nigel Bruce True, London (GB); Guy Stuart Ritchie, London (GB)

(73) Assignee: The Cashmere Caveman Co, Wild Kitchens Limited, London (GB)

( * ) Notice: Subject to any disclaimer, the term of this patent is extended or adjusted under 35 U.S.C. 154(b) by 325 days.

This patent is subject to a terminal disclaimer.

(21) Appl. No.: 16/993,938

(22) Filed: Aug. 14, 2020

(65) Prior Publication Data

US 2021/0177204 A1   Jun. 17, 2021

Related U.S. Application Data

(63) Continuation-in-part of application No. 16/711,147, filed on Dec. 11, 2019, now Pat. No. 11,179,003.

(51) Int. Cl.
| | | |
|---|---|---|
| A47J 37/07 | (2006.01) | |
| A47B 31/02 | (2006.01) | |
| A47J 37/06 | (2006.01) | |
| F24B 1/00 | (2006.01) | |
| F24B 5/06 | (2006.01) | |
| F24C 1/02 | (2021.01) | |
| A47B 33/00 | (2006.01) | |
| F24B 1/02 | (2006.01) | |

(52) U.S. Cl.
CPC ......... *A47J 37/0781* (2013.01); *A47B 31/02* (2013.01); *A47J 37/0647* (2013.01); *A47J 37/0704* (2013.01); *A47J 37/0786* (2013.01); *F24B 1/006* (2013.01); *F24B 5/06* (2013.01); *F24C 1/02* (2013.01); *A47B 33/00* (2013.01); *A47J 2037/0795* (2013.01); *F24B 1/028* (2013.01)

(58) Field of Classification Search
CPC ... A47J 37/0647; A47J 37/0781; A47B 31/02; F24C 1/02; F24B 1/028
USPC ...................................... 126/25 A
See application file for complete search history.

(56) References Cited

U.S. PATENT DOCUMENTS

| | | |
|---|---|---|
| 3,217,634 A | 11/1965 | Fox |
| 3,491,744 A | 1/1970 | Von, Jr. |
| 3,745,303 A | 7/1973 | Epperson et al. |
| 3,972,276 A | 8/1976 | Kamra |
| 4,635,612 A | 1/1987 | Kakubari et al. |
| 4,664,026 A | 5/1987 | Milloy |
| 4,759,276 A | 7/1988 | Segroves |
| 4,840,128 A | 6/1989 | McFarlane et al. |

(Continued)

FOREIGN PATENT DOCUMENTS

| | | |
|---|---|---|
| CN | 105091034 A | 11/2015 |
| CN | 205053277 U | 3/2016 |

(Continued)

OTHER PUBLICATIONS

Non-Final Office Action issued in U.S. Appl. No. 17/319,621, dated Jul. 19, 2021 (22 pages).

(Continued)

*Primary Examiner* — Avinash A Savani
(74) *Attorney, Agent, or Firm* — Morrison & Foerster LLP

(57) ABSTRACT

A mechanism for raising and lowering a cooking surface within a recessed combustion chamber is provided.

20 Claims, 32 Drawing Sheets

(56) References Cited

U.S. PATENT DOCUMENTS

| | | |
|---|---|---|
| 5,094,221 A | 3/1992 | Ho |
| 5,168,796 A | 12/1992 | Porton et al. |
| 5,183,027 A | 2/1993 | Saldana |
| 5,421,321 A | 6/1995 | Ward |
| 5,599,094 A | 2/1997 | Fischer et al. |
| 5,778,800 A | 7/1998 | Liang |
| 6,029,646 A | 2/2000 | Jackson |
| 6,065,466 A | 5/2000 | Baykal |
| 6,070,571 A | 6/2000 | Bradbury |
| 6,640,803 B2 | 11/2003 | Davis et al. |
| 7,681,493 B2 | 3/2010 | Moore |
| 3,020,546 A1 | 9/2011 | Bourgeois et al. |
| 9,474,414 B2 | 10/2016 | Yuen |
| 10,094,574 B2 | 10/2018 | Quigley |
| 10,206,537 B1 | 2/2019 | Ebbes |
| 10,575,680 B2 | 3/2020 | Fagg et al. |
| 11,015,818 B1 | 5/2021 | Ritchie et al. |
| 11,221,148 B1 | 1/2022 | True et al. |
| 2002/0185122 A1 | 12/2002 | Bossler |
| 2004/0154603 A1 | 8/2004 | Crawford et al. |
| 2006/0096545 A1 | 5/2006 | Cone et al. |
| 2007/0240583 A1 | 10/2007 | Lee |
| 2008/0178745 A1 | 7/2008 | Hong |
| 2013/0255659 A1 | 10/2013 | Fulp et al. |
| 2014/0174427 A1 | 6/2014 | Yuen |
| 2015/0013664 A1 | 1/2015 | Riel |
| 2015/0308692 A1 | 10/2015 | Hurt |
| 2020/0178729 A1 | 6/2020 | Ritchie et al. |
| 2021/0177202 A1 | 6/2021 | True et al. |
| 2021/0177204 A1 | 6/2021 | True et al. |
| 2021/0259464 A1 | 8/2021 | True et al. |
| 2021/0259466 A1 | 8/2021 | True et al. |
| 2022/0090798 A1 | 3/2022 | Ritchie et al. |
| 2022/0110479 A1 | 4/2022 | True et al. |
| 2022/0110481 A1 | 4/2022 | True et al. |

FOREIGN PATENT DOCUMENTS

| | | |
|---|---|---|
| CN | 205410943 U | 8/2016 |
| EP | 2666385 A1 | 11/2013 |
| FR | 2903291 A1 | 1/2008 |
| FR | 2953389 A1 | 6/2011 |
| GB | 2566042 A | 3/2019 |
| JP | S57203833 A | 12/1982 |
| KR | 19990026343 | 7/1999 |
| KR | 200412388 Y1 | 3/2006 |
| KR | 200433042 Y1 | 12/2006 |
| KR | 20090088033 A | 8/2009 |
| KR | 100950184 B1 | 3/2010 |
| KR | 20110000388 A | 1/2011 |
| RU | 166809 U1 | 12/2016 |
| WO | 96/01395 A1 | 1/1996 |
| WO | 2017/018589 A1 | 2/2017 |
| WO | 2019043351 A1 | 3/2019 |

OTHER PUBLICATIONS

Non-Final Office Action issued in U.S. Appl. No. 16/711,147, dated Jul. 21, 2021 (46 pages).

Non-Final Office Action issued in U.S. Appl. No. 17/319,647, dated Jul. 21, 2021 (21 pages).

Non-Final Office Action issued in U.S. Appl. No. 17/319,658, dated Jul. 21, 2021 (20 pages).

Notice of Allowance issued in U.S. Appl. No. 17/319,621, dated Nov. 12, 2021, 6 pages.

Federal Service on Intellectual Property Search Report issued in Russian Application No. 2020108401, and the English translation, 4 pages.

Russian Office Action issued in Russian Application No. 2020108401, dated Oct. 7, 2020, and the English translation, 6 pages.

International Search Report and Written Opinion issued in International Application No. PCT/IB2020/001031, dated Apr. 14, 2021, 12 pages.

Examination and Search Report issued in Application No. GB2014940.7, dated Mar. 3, 2021, 7 pages.

Search and Examination Report issued in United Kingdom Application No. GB2014940.7, dated Mar. 3, 2021, 7 pages.

Notice of Allowance issued in U.S. Appl. No. 17/318,380, dated Aug. 6, 2021, 28 pages.

Notice of Allowance issued in U.S. Appl. No. 17/319,647, dated Aug. 13, 2021, 9 pages.

Notice of Allowance issued in U.S. Appl. No. 17/319,658, dated Aug. 13, 2021, 9 pages.

Final Rejection issued in U.S. Appl. No. 16/604,725, dated Sep. 6, 2020, 11 pages.

Non-Final Office Action issued in U.S. Appl. No. 16/604,725, dated Nov. 25, 2020, 10 pages.

Notice of Allowance issued in U.S. Appl. No. 16/604,725, dated Apr. 29, 2021, 19 pages.

Australian Examination Report issued in Australian Application No. 2020286189, dated Dec. 23, 2021, 5 pages.

Notice of Allowance issued in U.S. Appl. No. 16/711,147, dated Aug. 18, 2021, 9 pages.

UKIPO Search Report issued in Application No. GB2014940.7, dated Oct. 6, 2021, 2 pages.

Australian "Examination Report" dated Oct. 31, 2019 issued for Australian Patent Application No. 2018325428.

Canadian Office Action dated Nov. 19, 2019 issued for Canadian Application No. 3,060,168.

International Search Report for International Application No. PCT/GB2018/000117.

Issued corresponding priority patent GB 2566042 B dated Sep. 4, 2019.

Response dated Sep. 5, 2018, for corresponding priority application GB 1713935.3.

UKIPO's "Combined Search and Examination Report" dated Feb. 9, 2018, for corresponding priority application GB 1713935.3.

UKIPO's "Intention to Grant" dated Jun. 19, 2019, for corresponding priority application GB 1713935.3.

UKIPO's "Notification of Grant" dated Aug. 6, 2019, for corresponding priority application GB 1713935.3.

UKIPO's "Search Report" dated Feb. 8, 2018, for corresponding priority application GB 1713935.3.

Written Opinion for International Application No. PCT/GB2018/000117.

Intention to Grant dated Sep. 15, 2022, directed to GB Application No. 2014940.7; 2 pages.

International Preliminary Report on Patentability dated May 17, 2022, directed to International Application No. PCT/IB2021/001031; 6 pages.

Ritchie et al., U.S. Office Action dated Dec. 7, 2022, directed to U.S. Appl. No. 17/200,103; 8 pages.

Ritchie et al., U.S. Office Action dated Jul. 24, 2020, directed to U.S. Appl. No. 16/604,725; 13 pages.

Ritchie et al., U.S. Office Action dated Nov. 17, 2020, directed to U.S. Appl. No. 17/025,681; 7 pages.

HEATING TABLE WITH ADJUSTABLE-HEIGHT GRILL

PRIORITY AND CROSS-REFERENCE TO RELATED APPLICATIONS

This application is a continuation-in-part of U.S. Ser. No. 16/711,147, filed on Dec. 11, 2019, which is incorporated by reference herein in its entirety.

TECHNICAL FIELD

The disclosure relates to an adjustable grill.

BACKGROUND

Outdoor gas heaters, fire pits, chimineas, and outdoor electric heaters are all available to provide heating for outdoor spaces, but each have their flaws. Outdoor gas heaters are environmentally destructive as they produce high levels of carbon emissions and are inefficient in heating outdoor areas. Flames from combusting fuel in fire pits and chimineas may be attractive to look at. However, fire pits and chimineas produce harmful particulate emissions. They are likewise inefficient in their consumption of fuel, and therefore expensive to run. Also, there is no means of controlling the smoke that fire pits and chimineas produce. Furthermore, the amount of heat produced by fire pits and chimineas cannot be easily controlled.

A heating table such as that described in WO/2019/043351 (incorporated herein by reference) addresses many of the above shortcomings by using combustible fuel to generate heat within a substantially sealed chamber to provide efficient, radiant heat without unsightly cords or cables. Such heating appliances may even be used to prepare food using a cooking surface that fits within the substantially sealed chamber. In this way, food can be cooked using the efficient radiant heat provided by such a table. Moreover, because such a heating table employs a substantially sealed heating chamber, any smoke produced can be easily controlled and directed away from the table and cooking surface. Thus, users of such a heating table can sit or stand near the cooking surface, while largely avoiding smoke or fumes produced during cooking and heating. This allows users to not only cook in an environment largely free of smoke and fumes, but to also enjoy the radiant heat produced by the heating table.

However, the use of a sealed combustion chamber, and the recessed nature of that chamber in a table format, present additional challenges when cooking food or manipulating the cooking surface. Accordingly, there is a need to better control the height of a cooking surface in a recessed chamber, without the use of complex mechanisms, while maximizing the surface area of the cooking surface that can fit within the confines of the chamber.

SUMMARY

Systems and methods of the invention include a simple, robust mechanism for raising and lowering a cooking surface in a recessed combustion chamber. Depending on the food being prepared and the cooking method or, when wishing to vary the heat exposure of a surface for any reason, it may be desirable to move the cooking or other surface closer to, or further away from a heat source. The ability to raise and lower a surface above a heat source can provide easier access to materials, such as food, placed on that surface. This ability to raise and lower and otherwise adjust the position of a surface above a heat source has applications in any heating system but is particularly useful when used in a high-temperature, recessed combustion chamber. The recessed nature of the chamber can make reaching the cooking surface difficult. Thus, the ability to raise the surface toward an opening at the top of the chamber provides much needed accessibility.

While various screw-drives, scissor jacks, and other lifting mechanisms might be used for the above purpose, they can be complex and may not withstand the intense, high-temperature environment of the combustion chamber long term. They can also be slow and tedious to manipulate. Moreover, such systems are often fixed to a particular cooking surface, such that the surface cannot easily be replaced or removed for easy cleaning. The systems and methods of the invention overcome these drawbacks.

System and methods of the invention allow a cooking surface in a combustion chamber to be quickly raised and lowered. The systems and methods employ a friction rod with a distal end at the floor of the combustion chamber and a proximal end towards the opening of the chamber. The friction rod passes through an aperture in the cooking surface and is positioned between two opposing friction members. The weight of the cooking surface and friction between the rod and two opposing friction members holds the cooking surface at potentially infinite positions above the heat source and/or the floor of the combustion chamber.

By simply canting or tilting one end of the cooking surface slightly toward the opening of the combustion chamber, the force of friction between the friction members and the friction rod can be reduced such that the rod slides freely relative to the friction members. This allows the cooking surface to be raised and lowered without difficulty.

Canting the end of the cooking surface can be accomplished by lifting one end of the cooking surface, or pushing down on the other end. In certain embodiments a tool or handle can be used to apply a force to cant the cooking surface, and/or to hold the cooking surface from above when raising or lowering the surface. When a desired position is reached, the force can be removed, which causes the cooking surface to no longer cant towards to the opening of the cooking chamber. When the cooking surface no longer cants towards the opening, and it is substantially parallel with the floor of the cooking chamber, the friction members of the cooking surface are aligned with the friction rod such that the rod engages both members. The frictional force between the rod and friction members, induced by the weight of the cooking surface, holds the cooking surface at the desired position.

The unique arrangement employed by the invention confers several advantages, especially in the narrow confines of a recessed cooking chamber. By foregoing complex height adjustment mechanisms, the cooking apparatus is more durable. Moreover, the components to raise and lower the cooking surface take up relatively little space, which maximizes the useable area of the cooking surface. Similarly, the components can be contained entirely within the perimeter of the cooking surface, rather than employing brackets or mounts attached to the side of the cooking surface. As such, the cooking apparatus of the invention can use the largest cooking surface able to fit within the narrow confines of the combustion chamber. Furthermore, the design allows the cooking surface to be completely removed from the cooking apparatus. This allows for easy cleaning and the ability to switch between different types of cooking surfaces, e.g., a grill, griddle, flat-top, pizza stone, basket, and the like.

Thus, aspects of the invention include a cooking system that may include: a heating apparatus comprising a recessed combustion chamber for receiving a combustible fuel, the recessed combustion chamber comprising a floor and an opening; a cooking surface comprising an aperture, a planar surface substantially parallel to the floor, and two opposing friction members; and a friction rod having a distal end near the floor and a proximate end near the opening. The friction rod passes through the aperture and between the two opposing friction members. Friction between the friction rod and the friction members can hold the cooking surface above, and substantially parallel, to the floor. Canting a portion of the cooking surface toward the opening can reduce the friction between the friction rod and friction members, such that the cooking surface can be raised or lowered relative to the floor.

In methods and systems of the disclosure, the cooking surface may be in contact with the heating apparatus via the friction rod alone. Alternatively, the system may include guides, such as additional rods running parallel to the friction rod. These guides can pass through apertures in the cooking surface. These additional apertures may be sufficiently larger than the aperture the friction rod passes through. The guides may not engage with friction members on the cooking surface. Accordingly, the guide rods do not interfere with the support function of the friction rod.

In certain methods and systems of the invention, the friction members do not extend beyond the perimeter of the cooking surface.

The friction between the rod and friction members may be induced by the weight of the cooking surface.

The systems and methods of the invention may employ a friction rod with a circular cross section, and the friction members may each comprise a semi-circular portion in which the friction rod frictionally engages the friction members. One or more of the friction members and friction rod may have a textured surface.

The friction members may comprise a first and second friction member, and the first friction member can be disposed above and towards the opening of the combustion chamber relative to the second friction member. The second friction member may be disposed within the aperture of the cooking surface. Alternatively, the second friction member can be disposed above or below the planar surface. The systems and methods of the invention also can also use a cooking surface that further comprises one or more surfaces perpendicular to the planar surface, which are affixed to the perimeter of the planar surface and extend vertically towards the opening of the combustion chamber. The first friction member can be affixed to the surface perpendicular to the planar surface.

The systems and methods of the disclosure may further include a friction rod that comprises one or more notches operable to associate with the friction members to position the cooking surface at one or more preset heights relative to the floor. The systems and methods may also include a cooking surface with a second aperture and a second friction rod having a distal end near the floor and a proximate end near the opening, the second friction rod passing through the second aperture.

Systems of the invention may further comprise comprising a handle operably associated with the cooking surface. The handle may be coupled to the cooking surface or may be removable. The handle can be operably associated with the cooking surface to perform the canting of the cooking surface toward the opening. The handle may be further operably associated with the cooking surface to raise the cooking surface, relative to the floor, along the friction rod.

The heating apparatus may further comprise a lid operable to cover at least a portion of the opening. The lid may be operable to substantially seal the combustion chamber.

The cooking surface may comprise a second aperture and the system may further comprise a second friction rod having a distal end near the floor and a proximate end near the opening, the second friction rod passing through the aperture hole.

In certain embodiments, systems may comprise a temperature sensor on the cooking surface. The friction rod can include one or more notches operable to associate with the hole to position the cooking surface at one or more preset heights relative to the floor.

At least a portion of one or more walls or the lid may be translucent or transparent to allow for the transmission of light generated by combustion to pass therethrough.

The heating apparatus further can include a catalytic converter for reducing emissions from the combustion chamber. In certain embodiments, the heating appliance may include an air inlet for supplying air to an inside of said chamber for combusting said combustible fuel.

Aspects of the invention also include a cooking system that may include: a heating apparatus comprising a recessed combustion chamber for receiving a combustible fuel, the recessed combustion chamber comprising a floor, at least one wall, and an opening; a cooking surface comprising a hole and a planar surface substantially parallel to the floor; and a friction rod having a distal end near the floor and a proximate end near the opening, the friction rod passing through the hole. Friction between the friction rod and the cooking surface can support the cooking surface above and substantially parallel to the floor. Rotation of a portion of the cooking surface toward the opening can then reduce the friction between the friction rod and cooking surface such that the cooking surface can be raised or lowered relative to the floor.

The cooking surface may only be in contact with the heating apparatus via the friction rod. Alternatively, the system may include guides such as additional rods running parallel to the friction rod and passing through holes in the cooking surface but where the holes are sufficiently larger than the hole the friction rod passes through. Accordingly, the guide rods do not interfere with the support function of the friction rod.

The friction between the friction rod and the cooking surface may provide the only support for the cooking surface relative to the floor.

The cooking surface may comprise a second hole and the system may further comprise a second friction rod having a distal end near the floor and a proximate end near the opening, the second friction rod passing through the second hole.

In certain embodiments, systems may comprise a temperature sensor on the cooking surface. The friction rod can include one or more notches operable to associate with the hole to position the cooking surface at one or more preset heights relative to the floor.

At least a portion of one or more walls or the lid may be translucent or transparent to allow for the transmission of light generated by combustion to pass therethrough.

The heating apparatus further can include a catalytic converter for reducing emissions from the combustion chamber. In certain embodiments, the heating appliance may include an air inlet for supplying air to an inside of said chamber for combusting said combustible fuel.

The cooking system can be included in a table having a heating appliance wherein the heating appliance can provide an attractive effect when producing heat and wherein the heating appliance alleviates at least one of the above-mentioned problems.

According to the present invention there may be provided a table having a table top containing an opening, and a heating appliance in said opening wherein said heating appliance extends at least beneath said table top, said table top opening comprising a recess in which said heating appliance is received, said recess having at least one wall below said table top, and said heating appliance having a substantially sealed chamber for receiving combustible fuel with which said heating appliance is used, said chamber having at least one window.

By the chamber being substantially sealed, the fuel can be used efficiently to produce heat which radiates from the chamber. The at least one window may allow an attractive view of flames from combusting fuel to be seen. The at least one window may comprise a pane. The at least one window may be translucent or transparent. The at least one window may comprise glass. The glass may be heat reflective.

The chamber may have a chamber opening and a door for closing the chamber opening. The chamber opening may be for placing combustible fuel, such as wood or charcoal, in the chamber with which the heating appliance is used.

The heating appliance may include an air inlet for supplying air to an inside of said chamber for combusting said combustible fuel. The heating appliance may have a control valve for controlling the supply of air through the air inlet.

The heating appliance may include a flue exhaust for emissions to exit from the chamber. The flue exhaust may extend above the chamber and above the table top. The flue exhaust directs emissions or smoke away from people sitting around the table. A parasol may be supported by the flue exhaust. The parasol can disguise the flue exhaust. The parasol can trap heat from the heating appliance to enhance the warming effect of the heating appliance of the table.

The chamber may have an emitting mechanism for emitting combustible gas into the chamber. The heating appliance may include a catalytic converter for reducing emissions, such as carbon emissions, from the chamber.

The heating appliance may extend above the table top. At least part of the at least one window may be above the table top. The door may be above the table top.

Alternatively, at least one said window may be substantially coplanar with an upper surface of the table top. When the door is in a closed position closing the chamber opening, the door may be substantially coplanar with the upper surface of the table top.

There may be a gap between the heating appliance and the at least one wall of the recess. The gap may form an air gap or a heat insulation gap. This provides a barrier to protect, say, tableware on the table top from direct heat from combusting fuel in the heating appliance. The wall may have at least one aperture.

The air inlet may be configured to receive air via the at least one wall aperture. The air inlet may comprise at least one entrance aperture, at least one exit aperture, and at least one conduit between the at least one entrance aperture and the at least one exit aperture, the at least one exit aperture being in an upper part of the chamber. The at least one conduit may be heated by heat generated by the combustible fuel in use. This causes air in at least one said conduit to rise.

The at least one exit aperture may be above at least one said window in a side of the heating appliance. The exit aperture may thus provide a flow of air past the window to prevent the accumulation of soot and smoke stains on the window. Also, air from the exit aperture may mix with flames from the combusting fuel igniting volatiles and unburnt carbons or smoke emitting from the combusting fuel thus providing cleaner combustion.

The chamber may have a lower part comprising a first heat conductive material and an upper part comprising a second heat conductive material, the first heat conductive material being more conductive than the second heat conductive material. The upper part may comprise the at least one window comprising the second heat conductive material.

The table may include a mechanism for raising or lowering the heating appliance relative to the table top. The heating appliance may be centrally positioned in the table top.

DETAILED DESCRIPTION

Systems and methods of the invention relate to a mechanism for positioning a surface with respect to a heat source. Specifically, one or more friction rods are passed through apertures within a cooking surface (e.g., a grill or griddle), and engage with opposing friction members on the cooking surface. Each friction member has a friction surface that partially surrounds the friction rod. The apertures are positioned on the cooking surface such that the weight of the cooking surface applies a torsional load on the cooking surface at its friction members where it interacts with the friction rod.

That torsional load aligns the cooking surface with the friction rod such that the friction surfaces of both friction members engage with the friction rod. The static friction between the rod and both friction members can hold the cooking surface (and any materials thereon) at potentially infinite positions above the floor of the combustion chamber, where combustible material or another heat source may reside.

Figure 20:
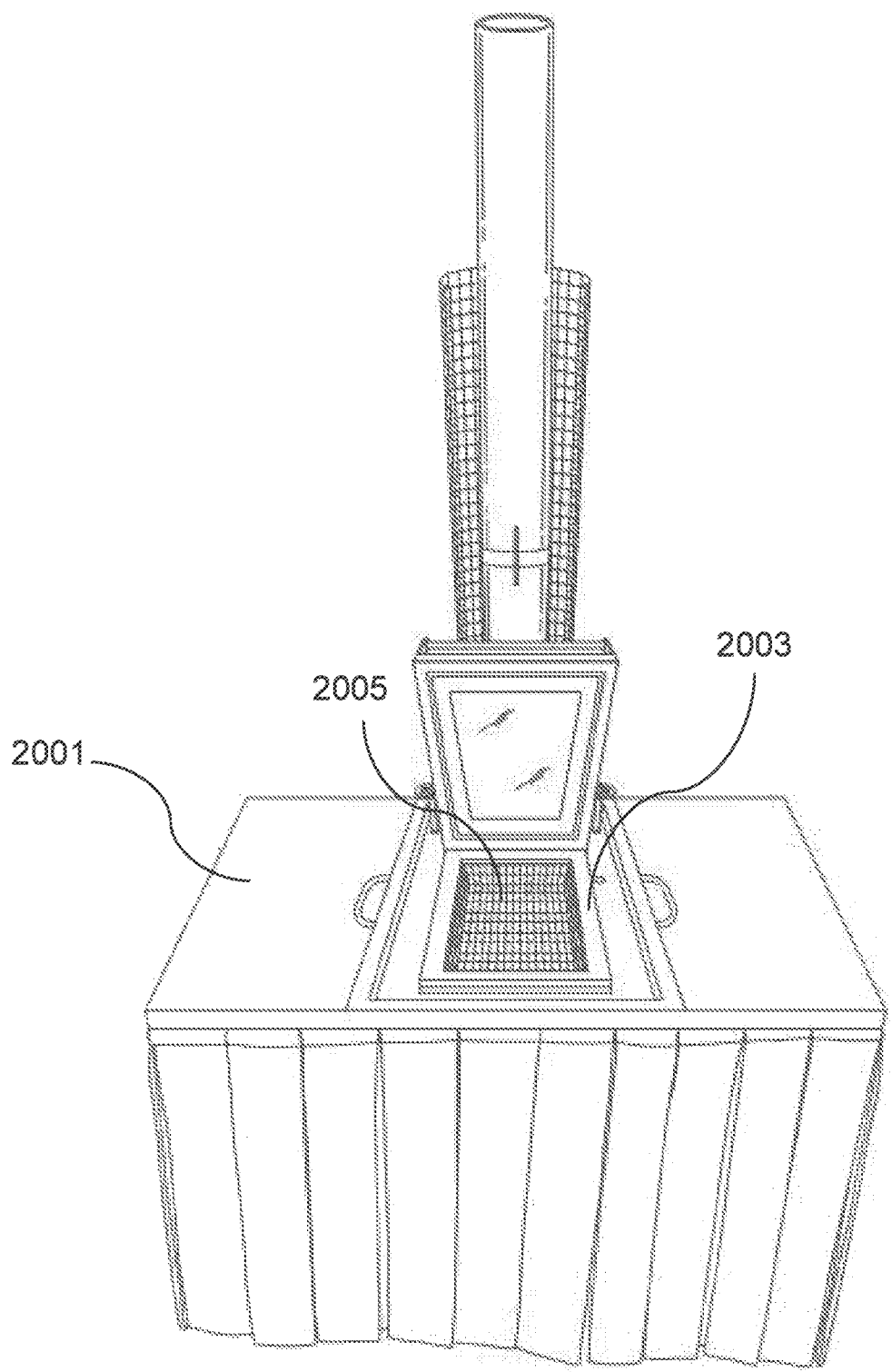
FIG. 20 shows a heating apparatus according to certain embodiments.

FIG. 20 illustrates a heating apparatus 2001 according to certain systems and methods of the disclosure. The heating apparatus 2001 includes a recessed combustion chamber 2003 and a cooking surface 2005 shown in a raised position suitable for loading and unloading food for cooking or other materials for heating.

Figure 21:
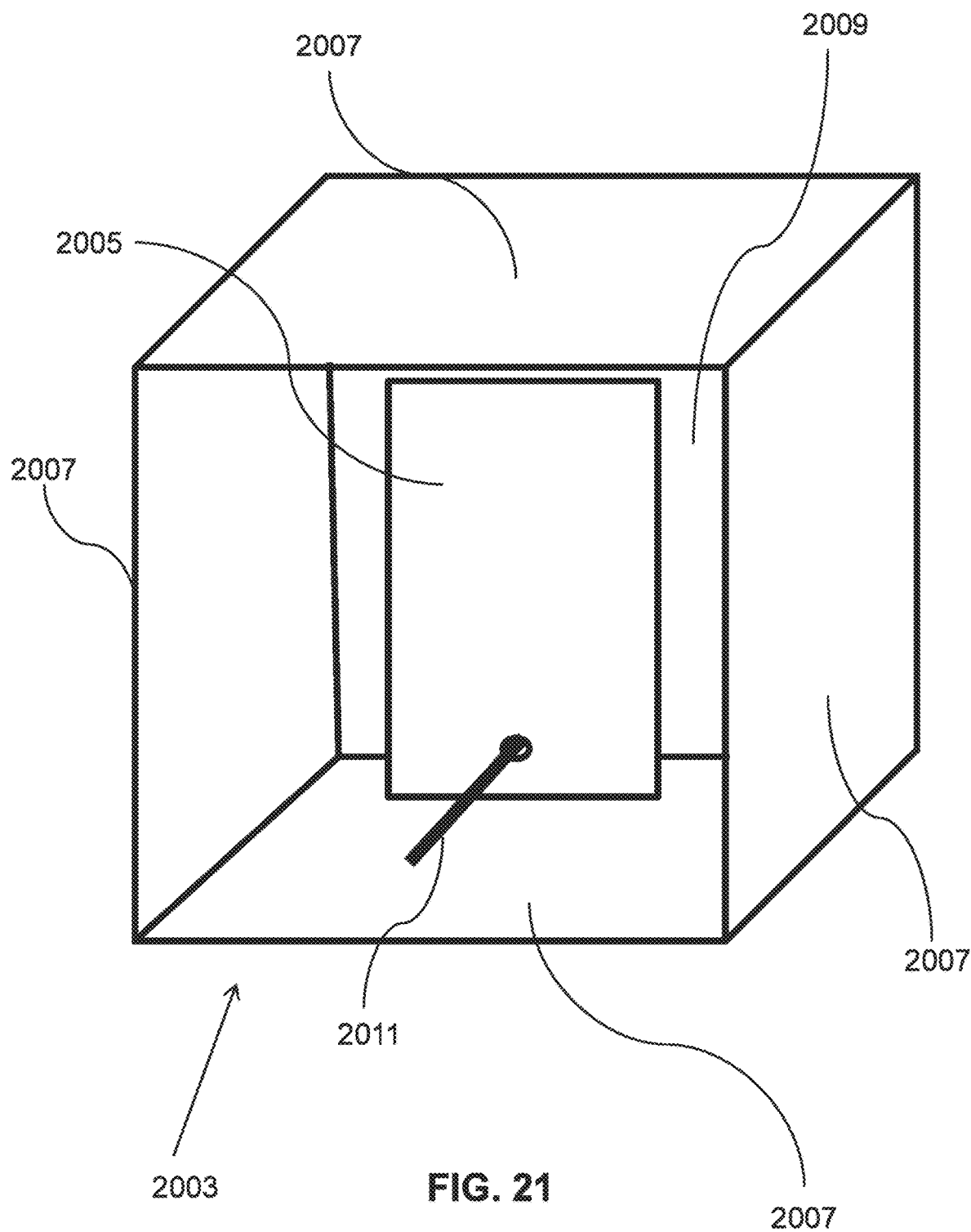
FIG. 21 shows a combustion chamber according to certain embodiments.

FIG. 21 shows additional detail of a combustion chamber 2003 according to various methods and systems of the disclosure. As shown, the combustion chamber 2003 has a floor 2009 and 4 walls 2007 forming an open cube shape. Within the chamber 2003 is a friction rod 2011 running approximately parallel to the planar surface of the walls 2007 from on or near the floor 2009 to an opening at the top of the chamber 2003. The friction rod 2011 passes through a hole or aperture 2013 in the cooking surface 2005. The rod 2011 may have any cross-sectional shape including, for example a circle, square, rectangle, hexagon, octagon, or pentagon.

While the chamber 2003 is depicted with walls and a recessed floor 2009, friction rod-based positioning mechanisms as described herein are equally suitable for use over open flames or other heat sources without a recessed container.

While the chamber 2003 is shown with 4 walls 2007, forming the shape of a cube, additional chamber shapes are contemplated including a circular chamber formed by a single continuous wall 2007. Any number of walls 2007 may provide a chamber having a cross-sectional profile of a triangle, a circle, an oval, a square, a pentagon, a hexagon, or any other shape.

Figure 27:
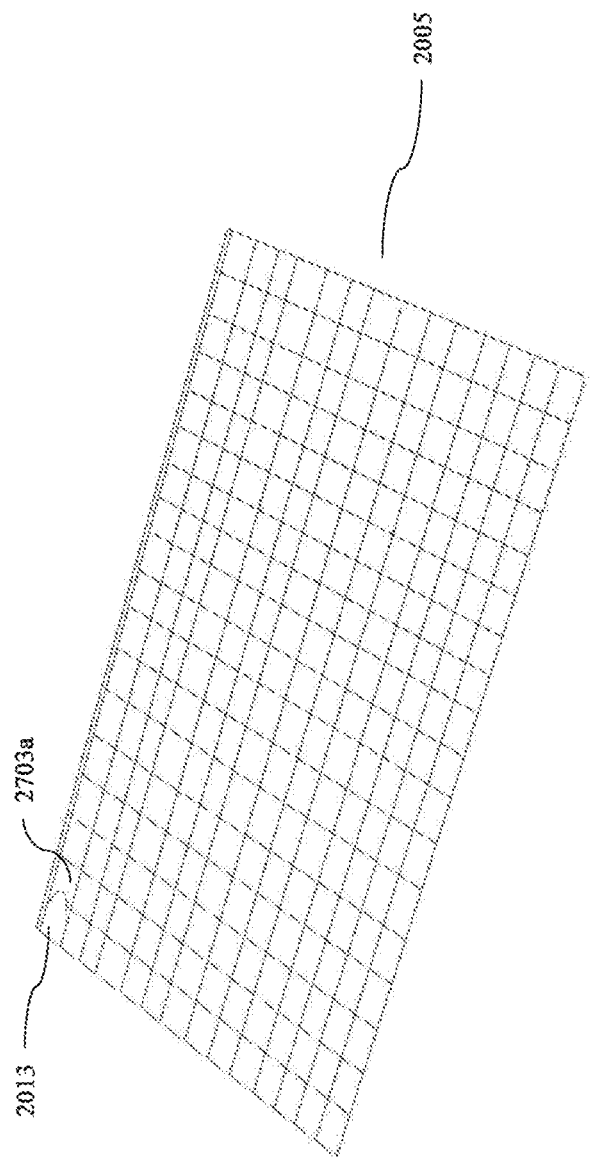
FIG. 27 shows an exemplary cooking surface with a friction member.

FIG. 27 illustrates the cooking surface 2005 with a friction member 2703a and aperture 2013. The friction member can be flush or integrated with the rest of cooking surface 2005. Friction member 2703a can be affixed to or a part of the rest of cooking surface 2005.

Figure 28:
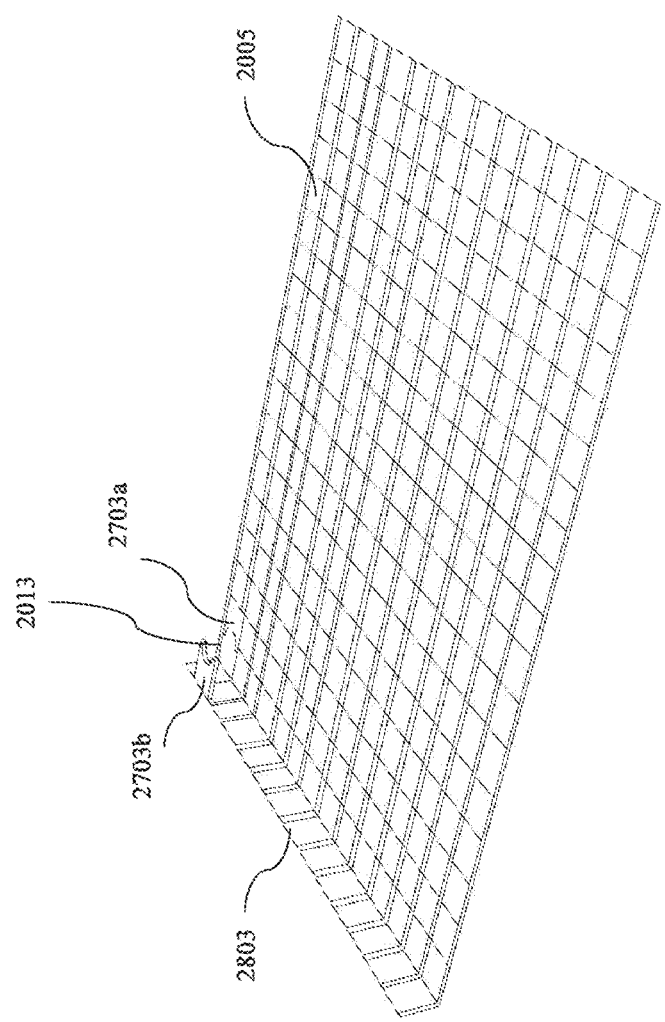
FIG. 28 shows an exemplary cooking surface with two friction members.

FIG. 28 illustrates the cooking surface 2005 with a surface generally perpendicular 2803 to the cooking surface 2005. Friction member 2703b is attached to the perpendicular surface 2803, and opposes friction member 2703a. The cooking surface 2005 may comprise a perpendicular surface on one or more edges along its perimeter. The perpendicular surface(s) can be low in profile and form a lip, or tall in profile such that they form the sides of a basket. The perpendicular surface(s) may run the entire length of an edge of the cooking surface. Alternatively, friction member 2703b can be attached to a perpendicular surface(s) that is narrow and/or does not run along an entire edge of the cooking surface.

In FIG. 28, the friction members are located entirely within the boundaries of the plane defining cooking surface 2005. By arranging the friction members in this way, brackets or mounts external to the boundaries of the cooking surface to support the members are not required. As such, the cooking surface can occupy a greater portion of the combustion chamber, maximizing the size of the cooking surface relative the narrow confines of the combustion chamber. Alternatively, the friction members can be attached to the cooking surface beyond the boundaries of the plane defining cooking surface 2005.

Figure 29:
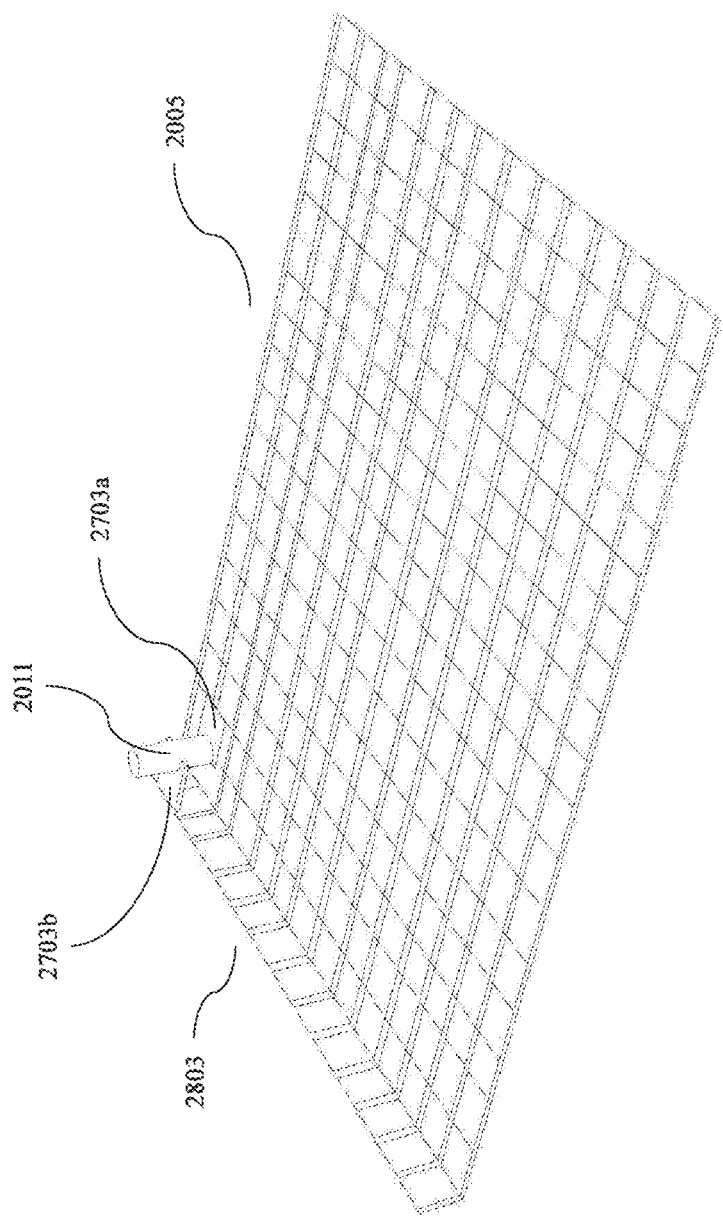
FIG. 29 shows an exemplary cooking surface with two friction members interacting with a friction rod to hold the cooking surface at a desired height.

FIG. 29 illustrates the opposing friction members 2703a and 2703b engaging the friction rod 2011 to hold the cooking surface 2005 at the desired height.

Figure 30:
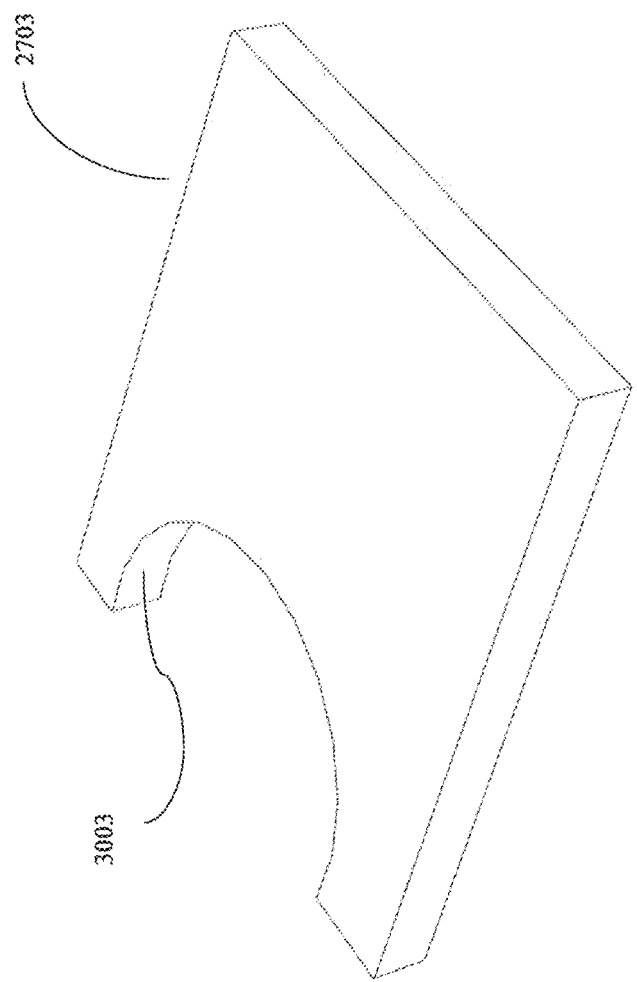
FIG. 30 shows an exemplary friction member.

FIG. 30 shows a friction member 2703. The friction member 2703 has an open friction surface 3003. This friction surface is preferably shaped to correspond with the shape of the friction rod 2011 to permit sufficient surface contact between the rod and surface to enable an adequate friction force. For example, friction member 2703 is shown with a semi-circular friction surface that could align with a friction rod having a circular cross section. Friction surface 3003 can be shaped in any number of ways to correspond with a particular friction rod. For example, friction surface 3003 can be shaped to accommodate friction rods having a cross section of a circle, square, rectangle, hexagon, octagon, or pentagon.

Friction surface 3003 can also have varying depths, e.g., shallow or deep, to best guide the friction rod into the friction surface, while still allowing the friction surface/member to easily disengage from the rod when desired. Each friction member can have a friction surface of a different depth. By varying the depth on each friction member, the angle of the cooking surface relative to the plane of the combustion chamber floor can be precisely controlled when the cooking surface is held. This assures that when the friction rod is aligned between the friction surfaces of each friction member, the cooking surface is substantially parallel with the plane of the combustion chamber floor.

Because the friction surface 3003 is open and only partially surrounds an engaged friction rod, the friction rod can be engaged and disengaged easily and with minimal force. Moreover, the open shape helps guide a friction rod into the friction surface 3003. The open shape facilitates, not only engaging the friction rod, but also quickly aligning the cooking surface when initially placed in the combustion chamber. This permits, for example, quickly swapping between different cooking surfaces depending on what type of food is being prepared.

Alternatively, one or more of the friction members used and disclosed herein completely surrounds the friction rod. Thus, the friction surface of such a friction member can completely surround the friction rod. Exemplary friction rods of this type include a collar-type friction member. Such a friction member may comprise a plate attached to, or integral with the cooking surface. The plate may have a hole or aperture through through which the friction rod passes. An surface of the hole may comprise the friction surface of the friction member. Methods and systems of the disclosure may use a combination of friction members that completely surround the friction rod and friction members that partially surround the friction rod.

Figure 31:
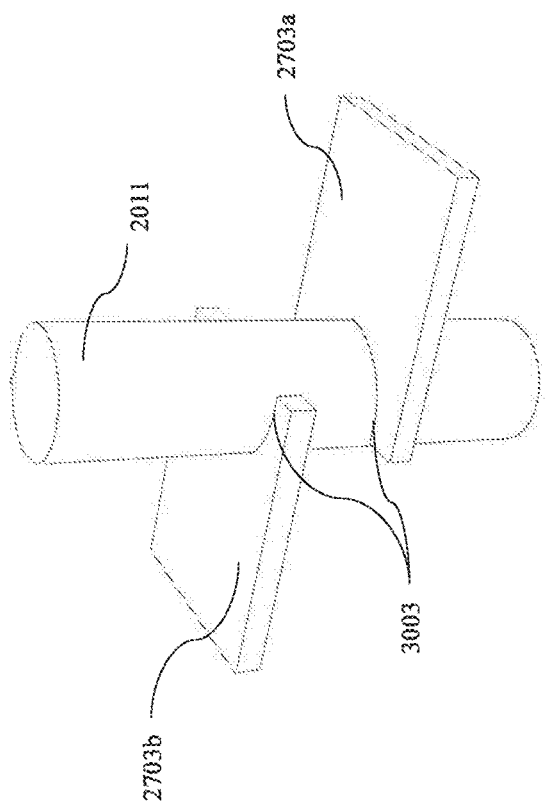
FIG. 31 shows engagement of two friction members with a friction rod.

FIG. 31 illustrates the interaction between the opposing friction members 2703a and 2703b and the friction rod 2011, when the cooking surface 2005 (not shown) is stably held in a position substantially parallel to the floor 2009 (not shown). The friction surfaces of opposing friction members 2703a and 2703b are in contact with the friction rod 2011, thereby providing adequate friction force to hold the cooking surface.

Figure 32:
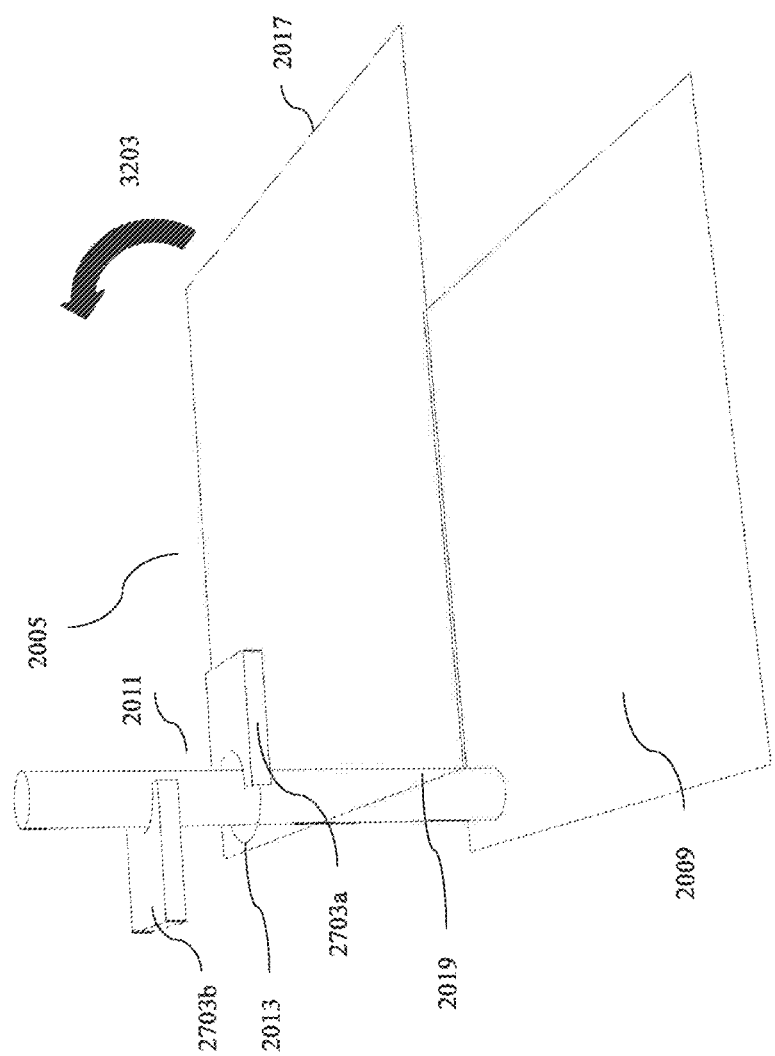
FIG. 32 shows an apparatus for raising and lowering a cooking surface using a friction rod and two friction members.

FIG. 32 illustrates the interaction between the cooking surface 2005 and the friction rod 2011 holding the cooking surface 2005 above the floor 2009, where the heat source may be located. Opposing friction members 2703a and 2703b are shown with friction rod 2011 between them. The friction members 2703a and 2703b make sufficient surface contact with the friction rod 2011 at the friction surface 3003 of each member to enable a friction force to hold the weight of the cooking surface and any items upon it.

When substantially parallel to the floor 2009, the cooking surface's weight provides a force in the opposite direction of 3203. This force aligns the cooking surface 2005 and its opposing friction members 2703a and 2703b with friction rod 2011 such that the rod engages the friction surface 3003 of each friction member. The resulting friction holds the weight of the surface 2005 and items placed thereon, at any number of positions above the floor 2009.

In order to adjust the position, a force in the direction of 3203 can be applied to the cooking surface 2005 by hand or using a tool to cant a portion of the cooking surface towards the opening of the combustion chamber. By canting the cooking surface 2005, some or all of the friction force between the friction rod and friction members can be relieved. The cooking surface 2005 can then be slid up or down the friction rod 2011 to change its position relative to the floor 2009 by hand or using a tool which may be the same tool as used to apply the force in to cant the cooking surface.

The cooking surface 2005 can be canted along an axis perpendicular to the friction rod 2011, such that a plane defined by the aperture 2013 is moved toward being perpendicular with the friction rod 2011. This canting alters the intersection of the plane defined by the aperture 2013 and the friction rod 2011 such that the opposing friction members are either not in contact with the friction rod 2011 or the force of the contact is reduced. This permits the cooking surface 2005 to slide up and down the friction rod 2011 somewhat freely. The cant can be induced by lifting up on one end 2017 of the surface 2005, pushing down on the other end 2019, or some combination thereof. In certain embodiments a handle may interact with the surface 2005 to apply the force to cant the cooking surface.

Because the friction surfaces 3003 of friction members 2703a and 2703b are open and only partially surround friction rod 2011, the friction rod can be engaged and disengaged easily and with less force. Moreover, the open shape helps guide the friction rod 2011 between the friction surfaces 3003.

The aperture 2013 and opposing friction members 2703a and 2703b can be positioned on the cooking surface 2005 at any point away from the cooking surface's center of gravity to provide the torsion force that engages the friction members with the friction rod 2011. Accordingly, the aperture 2013 and opposing friction members 2703a and 2703b may be positioned toward one edge of the cooking surface 2005, or the cooking surface 2005 may be weighted such that its center of gravity is toward one edge and the apertures 2013 and the opposing friction members 2703a and 2703b may be positioned toward the center of the surface 2005.

Rods, friction members, and cooking surfaces may be made of any material. Preferably they comprise materials sufficiently strong and heat resistant to operate in the combustion chamber while also having the desired friction characteristics. Such materials are well known and characterized, and may include glass, ceramics, and metals. Friction characteristics may be imparted to materials, such as metal, via surface manipulation, including cross hatching or scoring. Preferably, the cooking surface, rods, and friction members comprise materials that do react with one another.

In some systems and methods of the invention, one or more friction rods may be used, but should be positioned such that they do not interfere with the friction-inducing torsion force that holds the surface. For example, two or more rods may be located in-line with each other along the axis around which the cooking surface cants.

The rod may include notches allowing for particular height settings where release of the surface allows an edge of the friction members to enter the notch and hold the surface. Canting the cooking surface about an axis perpendicular to the rod, and towards the opening of the chamber, releases the friction members from the notch, allowing the surface to move. The location of the notches can act as a guide hold the cooking surface at particular heights above the heat source. However, by relying simply on friction, without the need for notches, the height selections can be infinitely variable.

The methods and systems of the disclosure may include using a friction rod, aperture in the cooking surface, and more than two friction members that contact the friction rod to hold the cooking surface at a desired height. In certain systems and methods, there are three, four, or more friction members that contact a particular friction rod. When more than two friction members are used, one or more of the friction members may be fully opposed, partially opposed, or not opposed to each other friction member. When more than two friction members are used, at least two of the friction members may be disposed at the same height relative to the cooking surface. In certain systems and methods of the disclosure, the cooking surface can be held by the combination of friction between one or more friction rod(s) and one or more friction member(s) in addition to friction between a hole in the cooking surface and one or more friction rod(s).

In various embodiments, systems may include a handle structured to interface with the cooking surface to allow the release of the friction-based force and the positioning (raising or lowering) of the cooking surface. To that end the handle may engage with the cooking surface to support leverage for canting a portion of the cooking surface towards to opening of the combustion chamber, as well as lift and lower the cooking surface when not engaged with the friction members.

Figure 25:
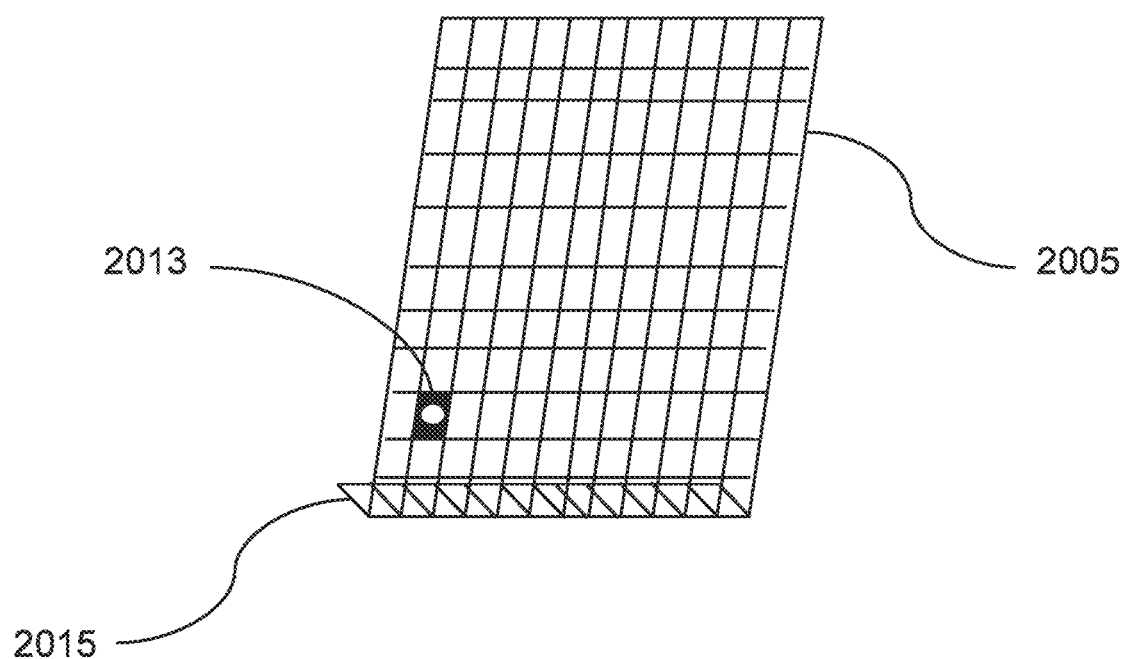
FIG. 25 shows an exemplary cooking surface.

Cooking surfaces may include grills, wire mesh baskets, solid griddles, or other types. They may be painted, enameled, or coated with various treatments or materials to prevent corrosion, degradation, or food sticking. FIG. 25 shows an exemplary cooking surface 2005 with a mesh construction. An aperture 2013 for the friction rod to pass through is shown near one corner of the surface 2005. The surface further includes a lip 2015 to allow manipulation by a handle.

Figure 26:
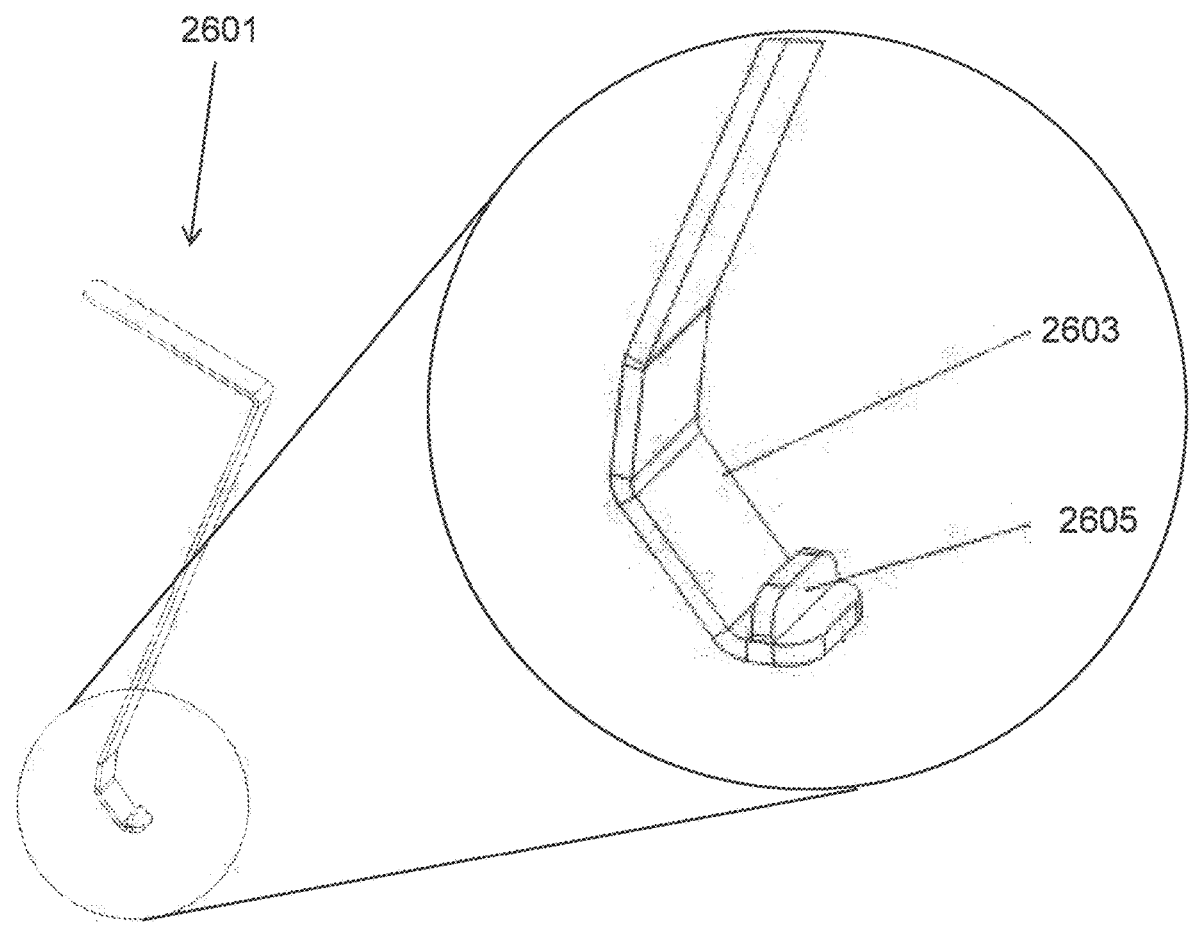
FIG. 26 shows an exemplary handle for positioning the cooking surface in the combustion chamber.

FIG. 26 shows an exemplary handle 2601 for positioning a surface using a friction rod as described herein. The handle 2601 may include portion operable to interact with the cooking surface as shown in the enlarged section. A grip portion may be included for manipulation by the hand of a user and may be separated from the surface-interacting portion by a length of material to allow the user to position the surface without being burned by proximity to the heat source. The handle 2601 may include one or more bends 2603 and notches 2605 to interact with the surface and/or lips 2015 thereon. For example a bend 2603 in the handle 2601 may be placed through a gap in a basket, grill, or other surface and then manipulated such that a portion of the handle 2601 and notch 2605 thereon grip the surface and allow a user to cant the cooking surface by applying a force to the handle 2601. The user may then lift or lower the surface using the same handle 2601. Upon reaching the desired position, the user can release the force, which reduces the cant of the surface, to allow the surface to be held at the desired position by the friction rod.

In various embodiments, methods of the invention may include raising or lowering cooking surfaces of the invention along a friction rod by applying forces to cant the cooking surface, which releases the friction holding the cooking surface at a height above the heat source. Systems and methods of the invention can be used to vary the distance from the heat source within the combustion chamber depending on temperature and food type. For example, for high-heat applications such as searing, the surface may be lowered closer to the heat source while in slower cooking, low temperature applications, the surface may be raised away from the heat source. Systems of the invention may include temperature sensor to indicate the approximate temperature of the surface. Surface position can then be manipulated to alter the temperature and achieve the desired temperature for a particular application.

In some systems and methods of the disclosure, the cooking surface uses friction from a hole in the surface to support the cooking surface on the friction rod.

FIG. 21 shows combustion chamber 2003 according to various methods and systems of the disclosure. As shown the combustion chamber 2003 has a floor 2009 and 4 walls 2007 forming an open cube shape. Within the chamber 2003 is a friction rod 2011 running approximately parallel to the planar surface of the walls 2007 from on or near the floor 2009 to an opening at the top of the chamber 2003. The friction rod 2011 passes through a hole in the cooking surface 2005.

While the chamber 2003 is depicted with walls and a recessed floor 2009, friction rod-based positioning mechanisms as described herein are equally suitable for use over open flames or other heat sources without a recessed container.

While the chamber 2003 is shown with 4 walls 2007, forming the shape of a cube, additional chamber shapes are contemplated including a circular chamber formed by a single continuous wall 2007. Any number of walls 2007 may provide a chamber having a cross-sectional profile of a triangle, a square, a pentagon, a hexagon, or any other shape.

Figure 22:
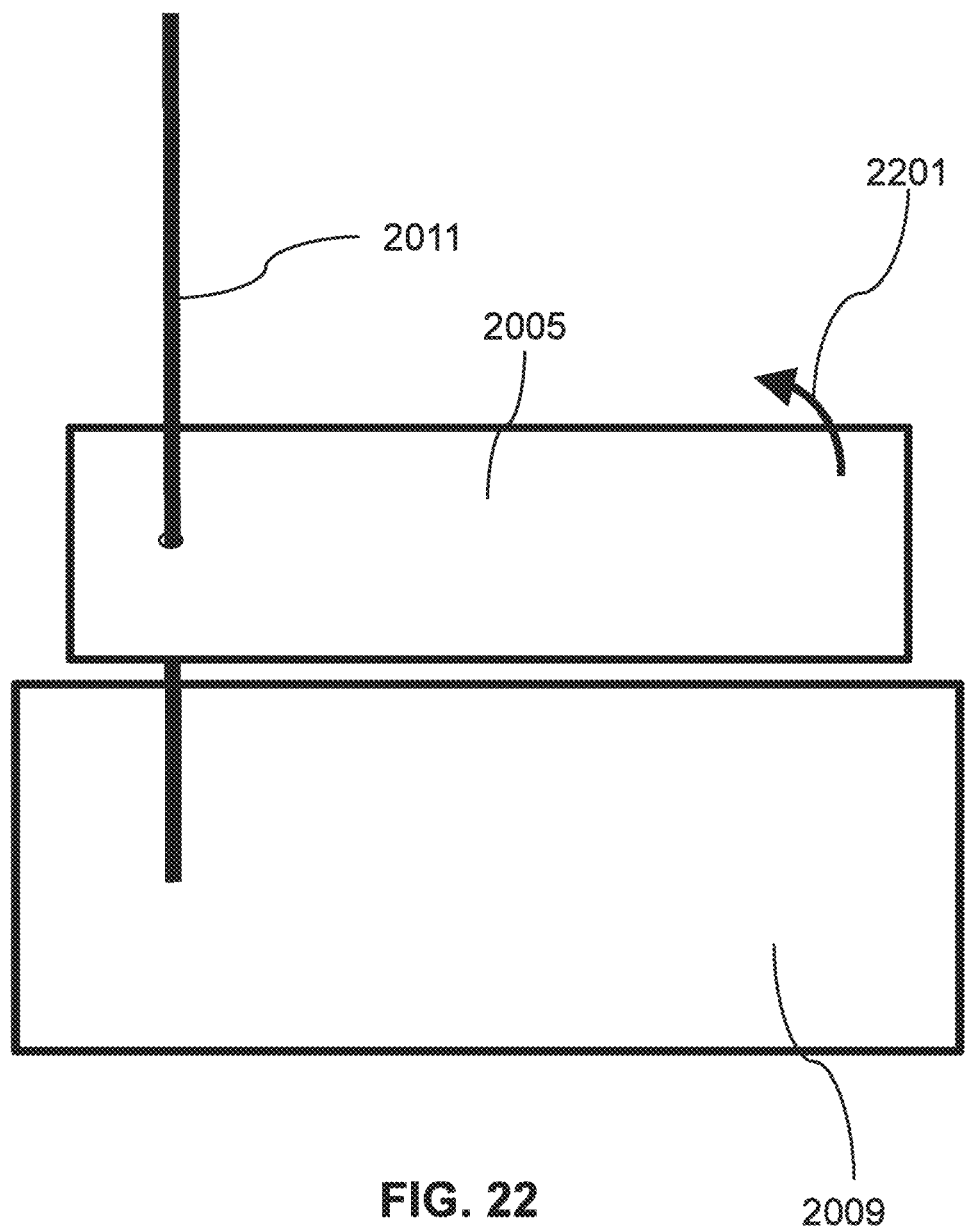
FIG. 22 shows a cooking surface positioning mechanism featuring a friction rod.

FIG. 22 illustrates the interaction between the cooking surface 2005 and the friction rod 2011 supporting the cooking surface 2005 above the floor 2009 where the heat source may be located. The rod 2011 may have any cross-sectional shape including, for example a circle, square, rectangle, hexagon, octagon, or pentagon. The hole 2013 in the cooking surface 2005 should be sized and shaped based on the cross-sectional profile of the rod 2011 so that the sides of the hole contact the rod 2011 when the cooking surface 2005 is substantially parallel to the floor 2009 but allows the rod to pass through the hole when a portion of the cooking surface 2005 is rotated upward toward the opening.

When substantially parallel to the floor 2009, the cooking surface's weight provides a rotational force in the opposite direction of 2201, forcing the sides of the cooking surface's 2005 hole to contact the friction rod 2011 as discussed above. The resulting friction supports the weight of the surface 2005 and items placed thereon at any number of positions above the floor 2009. In order to adjust the position, a force in the direction of 2201 can be applied to the cooking surface 2005 by hand or using a tool to relieve some of the friction between the rod 2011 and the surface 2005. The cooking surface 2005 can then be slid up or down the friction rod 2011 to change its position relative to the floor 2009 by hand or using a tool which may be the same tool as used to apply the rotational force.

Figure 23:
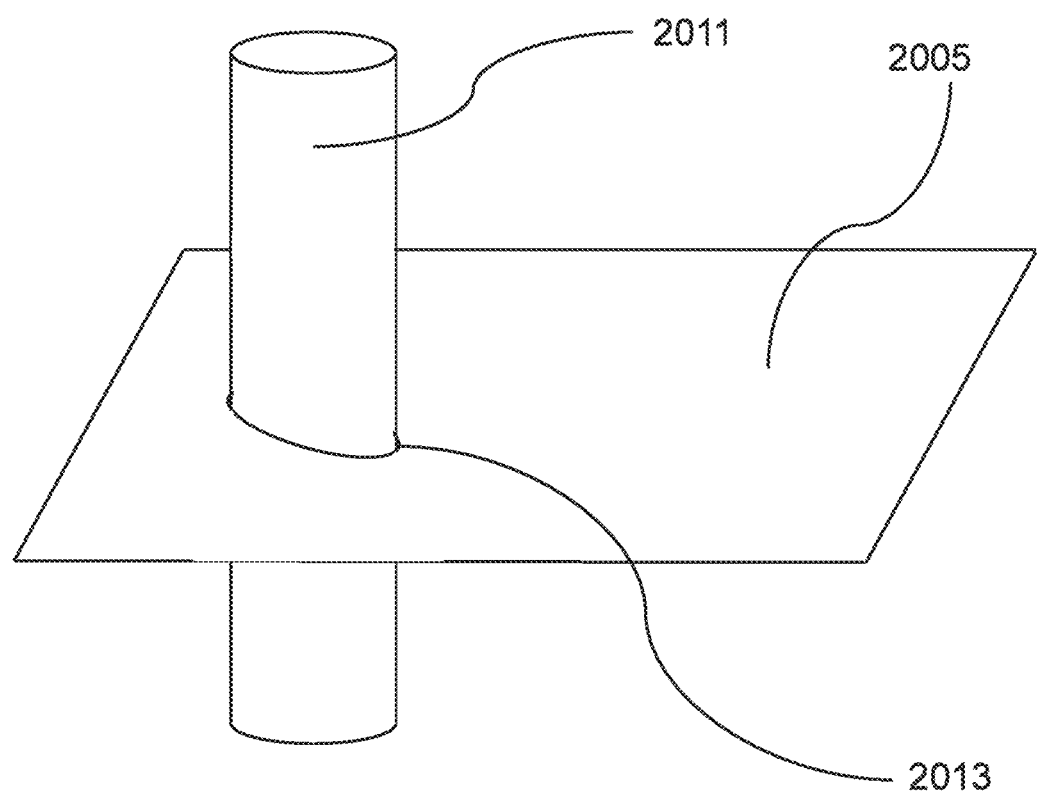
FIG. 23 shows the interaction between a cooking surface and a friction rod in a supported position.

FIG. 23 illustrates the interaction between the hole 2013 in the cooking surface 2005 and the friction rod 2011 when the cooking surface 2005 is stably supported in a position substantially parallel to the floor. The sides of the hole 2013 are in contact with the friction rod 2011 as discussed above. The hole 2013 can be positioned in the cooking surface 2005 at any point away from the cooking surface's 2005 center of gravity in order to provide the rotation-induced frictional forces required for support. Accordingly, the hole 2013 may be positioned toward one edge of the cooking surface 2005 or the cooking surface 2005 may be weighted such that its center of gravity is toward one edge and the hole 2013 may be positioned toward the center of the surface 2005.

Figure 24:
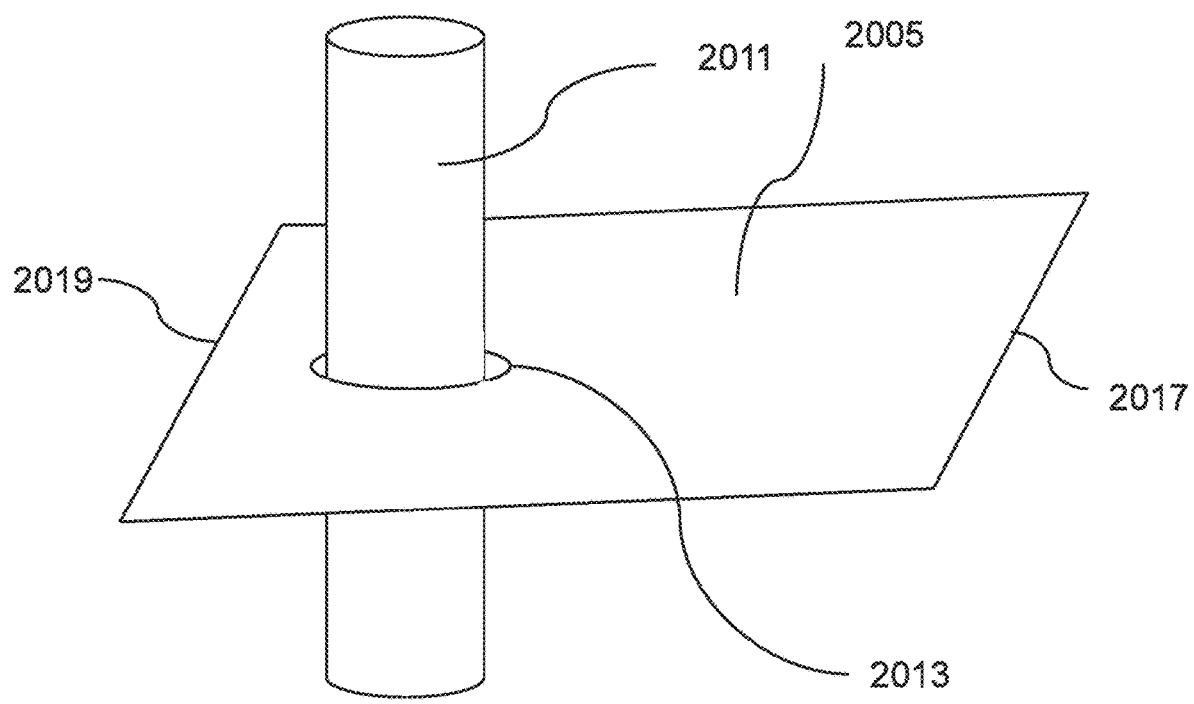
FIG. 24 shows the interaction between a cooking surface and a friction rod in a rotated position for raising or lowering the cooking surface.

FIG. 24 illustrates the interaction between the hole 2013 in the cooking surface 2005 and the friction rod 2011 when the cooking surface 2005 is rotated to release friction between the sides of the hole 2013 and the friction rod 2005. The cooking surface 2005 has been rotated along an axis perpendicular to the friction rod 2011 such that a plane defined by the hole 2013 is moved toward being perpendicular with the friction rod 2011. That rotation alters the intersection of the plane defined by the hole 2013 and the friction rod 2011 such that the sides of the hole 2013 are either not in contact with the friction rod 2011 or the force of the contact is reduced so that the surface 2005 can be slid up and down the friction rod 2011 somewhat freely. The rotation can be induced by lifting up on one end 2017 of the surface 2005 or pushing down on the other end 2019 or some combination thereof. In certain embodiments a handle (as discussed below) may interact with the surface 2005 to apply the rotational force.

One or more friction rods may be used but should be positioned such that they do not interfere with the friction-inducing rotational force that supports the surface. For example, two or more rods may be located in-line with each other along the axis of rotation of the surface.

Rods and cooking surfaces may be made of any material. Preferably materials sufficiently strong and heat resistant to operate in the combustion chamber and having the desired friction characteristics are selected. Such materials are well known and characterized including glass, ceramics, and metals. Friction characteristics may be imparted to materials such as metal via surface manipulation such as cross hatching.

In various embodiments, methods of the invention may include raising or lowering cooking surfaces of the invention along a friction rod by applying rotational forces to release and restore the friction supporting the surface. Systems and methods of the invention can be used to vary the distance from the heat source within the combustion chamber depending on temperature and food type. For example, for high-heat applications such as searing, the surface may be lowered closer to the heat source while in slower cooking, low temperature applications, the surface may be raised away from the heat source. Systems of the invention may include temperature sensor to indicate the approximate temperature of the surface. Surface position can then be manipulated to alter the temperature and achieve the desired temperature for a particular application.

The rod may include notches allowing for particular height settings where release of the surface allows an edge of the hole to enter the notch and support the surface. Rotation of the cooking surface about an axis perpendicular to the rod releases the edge of the hole from the notch, allowing the surface to move. The location of the notches can act as a guide to particular height positions. However, by relying simply on friction, without the need for notches, the height selections can be infinitely variable.

In various embodiments, systems may include a handle structured to interface with the cooking surface to allow the release of the friction-based force and the positioning (raising or lowering) of the cooking surface. To that end the handle may engage with the cooking surface to support leverage for vertical rotation of a portion of the cooking surface as well as lifting and lowering.

Cooking surfaces may include grills, wire mesh baskets, solid griddles, or other types. They may be painted, enameled, or coated with various treatments or materials to prevent corrosion, degradation, or food sticking. FIG. 25 shows an exemplary cooking surface 2005 with a mesh construction. A hole 2013 for the friction rod to pass through is shown near one corner of the surface 2005. The surface further includes a lip 2015 to allow manipulation by a handle.

FIG. 26 shows an exemplary handle 2601 for positioning a surface using a friction rod as described herein. The handle 2601 may include portion operable to interact with the cooking surface as shown in the enlarged section. A grip portion may be included for manipulation by the hand of a user and may be separated from the surface-interacting portion by a length of material to allow the user to position the surface without being burned by proximity to the heat source. The handle 2601 may include one or more bends 2603 and notches 2605 to interact with the surface and/or lips 2015 thereon. For example a bend 2603 in the handle 2601 may be placed through a gap in a basket, grill, or other surface and then manipulated such that a portion of the handle 2601 and notch 2605 thereon grip the surface and allow a user to rotate the cooking surface by applying a rotational force to the handle 2601. The user may then lift or lower the surface using the same handle 2601. Upon reaching the desired position, the user can release the rotational force and allow the surface to be supported at the desired position by the friction rod.

In certain systems and methods of the disclosure, a combination of one or more hole(s), friction rod(s), and/or friction member(s) disclosed and used herein can be used to hold the cooking surface at a desired height.

Referring to FIGS. 1 to 5 of the accompanying drawings, a table 1 has a table top 2 containing an opening 3 centrally positioned therein, and two pairs of legs 4 to support the table top 2. The opening 3 forms a rectangular recess 5 extending beneath the table top 2. The recess 5 has two longitudinal side walls 6, two end walls 7 and a base 8, wherein the two longitudinal side walls 6 each have a plurality of apertures or perforations 9. The walls 6, 7 and base 8 of the recess 5 may comprise metal.

The recess 5 receives a heating appliance or stove 10, and mounted on the base 8 of the recess 5 is a scissors jack 11 for raising or lowering the heating appliance 10 relative to the table top 2 of the table 1. A handle 12 for operating the scissors jack 11 extends beyond the outside of one of the longitudinal side walls 6.

The heating appliance 10 comprises a cuboid shaped chamber 13 wherein the chamber 13 has a frame 14. The frame 14 has a base 15 and four legs 16 extend from beneath the frame base 15 to rest on the recess base 8 of the table 1 and the top of the scissors jack 11 is arranged to engage the underside of the frame base 15. When the scissors jack 11 is used to raise the heating appliance 1, the legs 16 are lifted off the recess base 8 and the scissors jack 11 can be used to lower the heating appliance 10 until the legs 16 engage the recess base 8. The frame base 15 supports a bed of loose ceramic fire bricks 17.

The chamber frame 14 comprises a lower rectangular annular conduit 18 on top of the frame base 15 and extending around the perimeter of the frame base 15 wherein the lower rectangular annular conduit 18 has two longitudinal side conduit portions 19 and two end conduit portions 20. The chamber frame 14 also has an upper rectangular annular conduit 21 wherein the upper rectangular annular conduit 21 has two longitudinal side conduit portions 22 and two end conduit portions 23. Each corner of the upper rectangular annular conduit 21 is connected to the corresponding corner of the lower rectangular annular conduit 18 by a conduit column 24. There are also three equally spaced columns 25 between the conduit columns 24 at opposite ends of the lower and upper longitudinal side conduit portions 9, 22. On the underside of each upper end conduit portion 23 is a slot 26. On the underside of each upper longitudinal side conduit portion 22 is a series of slots 27 wherein each slot 27 is either between adjacent columns 25 or between a column conduit 24 and an adjacent column 25. These slots 26, 27 form exit slots or apertures. On the underside of each lower longitudinal side conduit portion 19 is a series of slots or entrance slots or apertures 28. At either end of the series of entrance slots 28 is a pin 29 which extends downwards from the underside of the chamber frame base 15. A shaft 30 extends through the central column 25a of the three equally spaced columns 25 from the top of the chamber frame 14 to the base 15 and a top end portion 31 of the shaft 30 is threaded. A nut 32 is screwed on to the threaded top end shaft portion 31 and prevents the shaft 30 from falling through the central column 25a. The lower end of shaft 30 is fixed to a control bar 33 which has an aperture 34 at either end wherein each aperture 34 receives a respective one of the pins 29. The control bar 33 is thus aligned with the series of entrance slots 28 on the underside of the lower longitudinal side conduit portion 19.

Each end of the heating appliance 10 has a pane of heat reflective glass 35 bounded by the lower and upper end conduit portions 20, 23 and the column conduits 24. Each side of the heating appliance 10 has a pane of heat reflective glass 36 bounded by the lower and upper longitudinal side conduit portions 19, 22 and by adjacent columns 25 or by a column conduit 24 and an adjacent column 25.

The heating appliance 10 extends above the table top 2 of the table 1 and there is an air gap 37 between the part of the heating appliance 10 below an upper planar or flat surface of the table top 2 and the walls 6, 7 of the recess 8.

The top of the chamber frame 14 supports a central flue exhaust 38 extending from a flue base 39 that spans between longitudinal sides 40 of the frame 14. A hot plate or cooking plate 41 is supported by the frame 14 to either side of the flue base 39. An opening 42 into the chamber 13 is bounded by the longitudinal sides of the chamber frame 14, and between each hot plate 41 and the adjacent upper end conduit portion 23. The opening 42 is closed by a door 43 comprising a door frame 44 having a pane of heat reflective glass 45, and each door 43 is arranged to open about a hinged connection 46 adjacent a respective hot plate 41. An upper part 48 of the chamber 13 contains the windows 35, 36, 45 and a lower part 49 of the chamber 13 is beneath the windows 35, 36. The lower part 49 of the chamber 13 more readily conducts heat than the windows 35, 36, 45.

In a specific example of a preferred embodiment, the heat reflective glass 35, 36, 45 may be Robax® glass. The walls 6, 7 of the recess 5 may comprise steel which may be 1.5 mm thick. The thickness of the air gap 37 between the part of the heating appliance 10 below the upper surface of the table top 2 and the walls 6, 7 of the recess 5 may be between 20 and 80 mm. A heat shield may also be included in or adjacent the air gap 37. Each hot plate 41 may be a steel plate.

When the heating appliance 10 of the table 1 is to be used, the doors 43 are opened and combustible fuel 47, such as logs of wood or charcoal, is placed in the chamber 13 on the bed of fire bricks 17. The combustible fuel 47 is lit and the doors 43 are closed to substantially seal the chamber 13. A flow of air passes through the apertures 9 in the longitudinal side walls 6 of the recess 5, and the conduits 18, 21, 24 of chamber frame 14 wherein the air enters the frame 14 via the entrance slots 28 in the lower longitudinal side conduits 9 and leaves the frame 14 via the exit slots 26, 27 in the upper longitudinal side conduits 22 to enable the combustible fuel in the chamber 13 to burn or combust. The slots 26, 27, 28 and the conduits 18, 21, 24 of the chamber frame 14 form an air inlet, and the air in the conduits 18, 21, 24 is heated by heat generated by the combusting fuel.

The exit slots 26, 27 are above windows 35, 36 in the sides of the chamber 13, and they provide a flow of air past the windows 35, 36 to prevent the accumulation of soot and smoke stains on the windows 35, 36. Also, by the air in the conduits 18, 21, 24 being heated and heat being reflected by the glass windows 35, 36, 45, the temperature in the chamber 13 can be raised to about 300° C. which would burn any soot off the glass. In addition, air from the exit slots 26, 27 mix with flames from the combusting fuel igniting volatiles and unburnt carbons or smoke emitting from the combusting fuel to provide cleaner combustion and products of combustion exit the chamber 13 via the flue exhaust 38.

The windows 35, 36, 45 allow an attractive view of flames from combusting fuel to be seen. The flames may also be seen through the parts of the windows 35, 36 below the table top 2 via the apertures 9 in the side longitudinal walls 6 of the recess 5. Heat generated by the combusting fuel is mainly radiated under the table top 2 of the table 1 to warm people sitting around the table 1 via the part of the heating appliance 10 beneath the heat reflecting windows 35, 36 and beneath the table top 2 with the table top 2 trapping radiated heat beneath it. Some heat though is transmitted through the heat reflective glass 35, 36, 45 and can provide some warmth above the table top 2. The air gap 37 between the heating appliance 10 and the walls 6, 7 of the recess 5 provide some insulation from the heat generated. By using the handle 12 to operate the scissors jack 11 to raise or lower the heating appliance 10 relative to the table top 2, the heat radiated under the table top 2 of the table 1 can be decreased or increased, respectively. This also causes more or less of the windows 35, 36 in the sides of the heating appliance 10 to be shown above the table top 2 so that the visual impact of the flames can be increased or decreased.

The amount of heat radiated can also be controlled by rotating the nuts 32 to raise the control bars 33 towards the entrance slots 28 or lower the control bars 33 away from the entrance slots 28 so that the control bar 33 acts as a valve to control the supply of air to the chamber 13.

Figure 1:
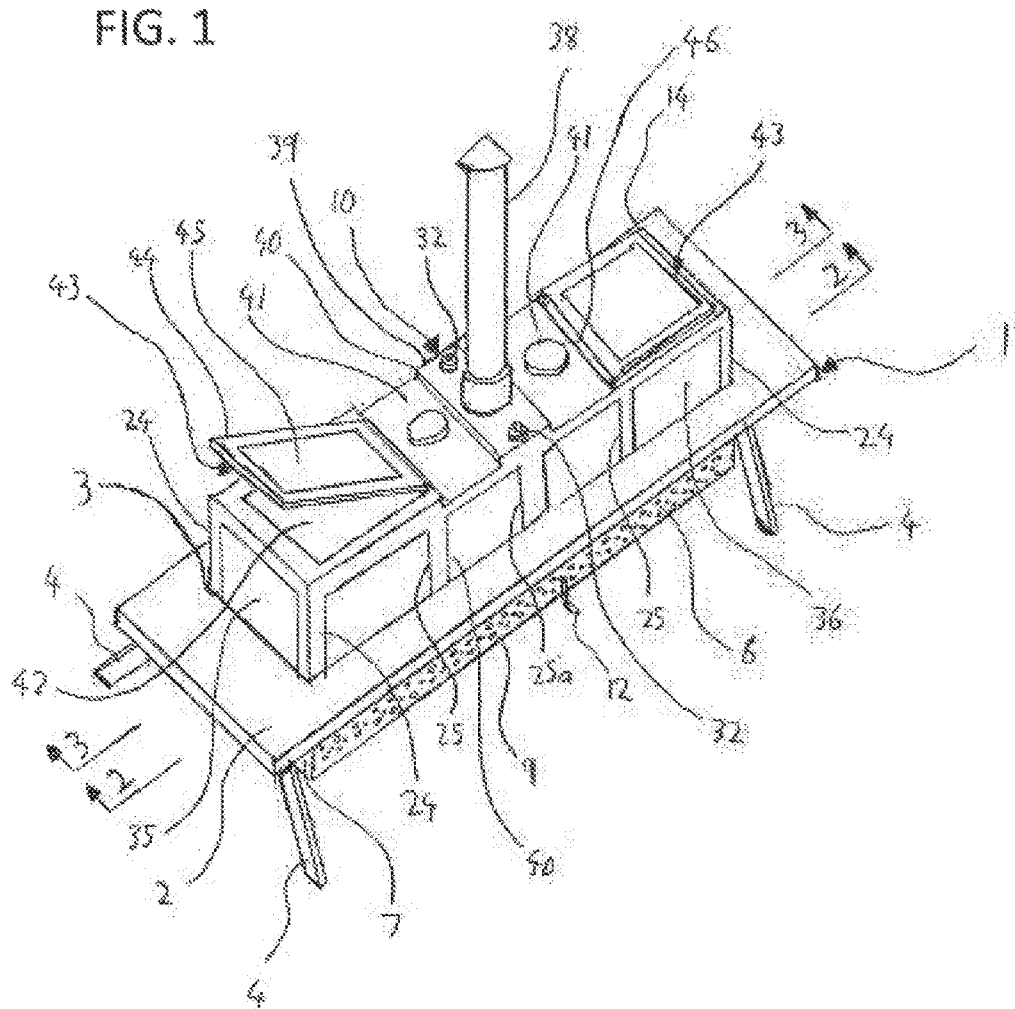
FIG. 1 is a perspective view of a table according to one embodiment of the invention.
Figure 2:
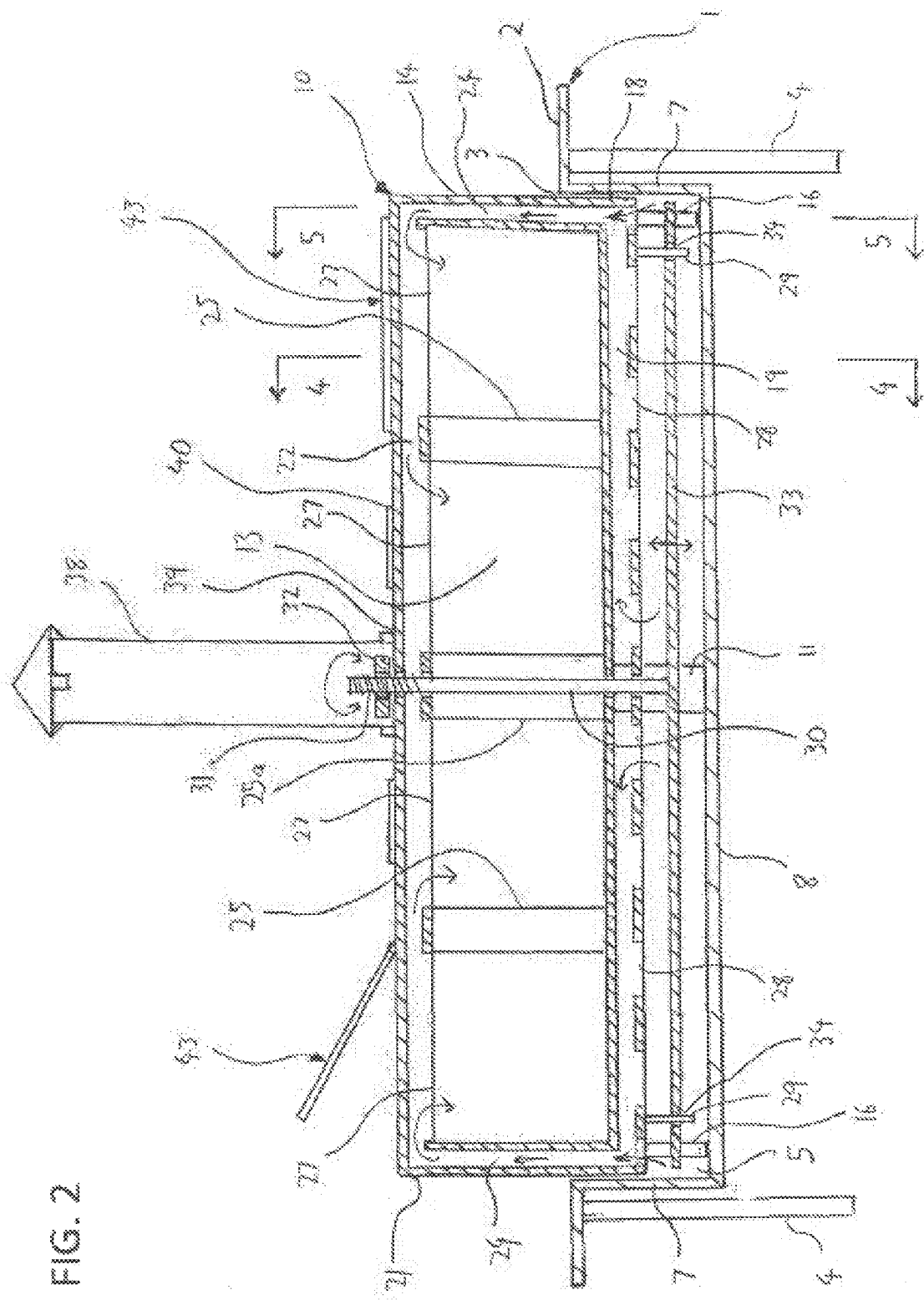
FIGS. 2 and 3 are sectional view taken along lines 2-2 and 3-3, respectively, of FIG. 1.
Figure 3:
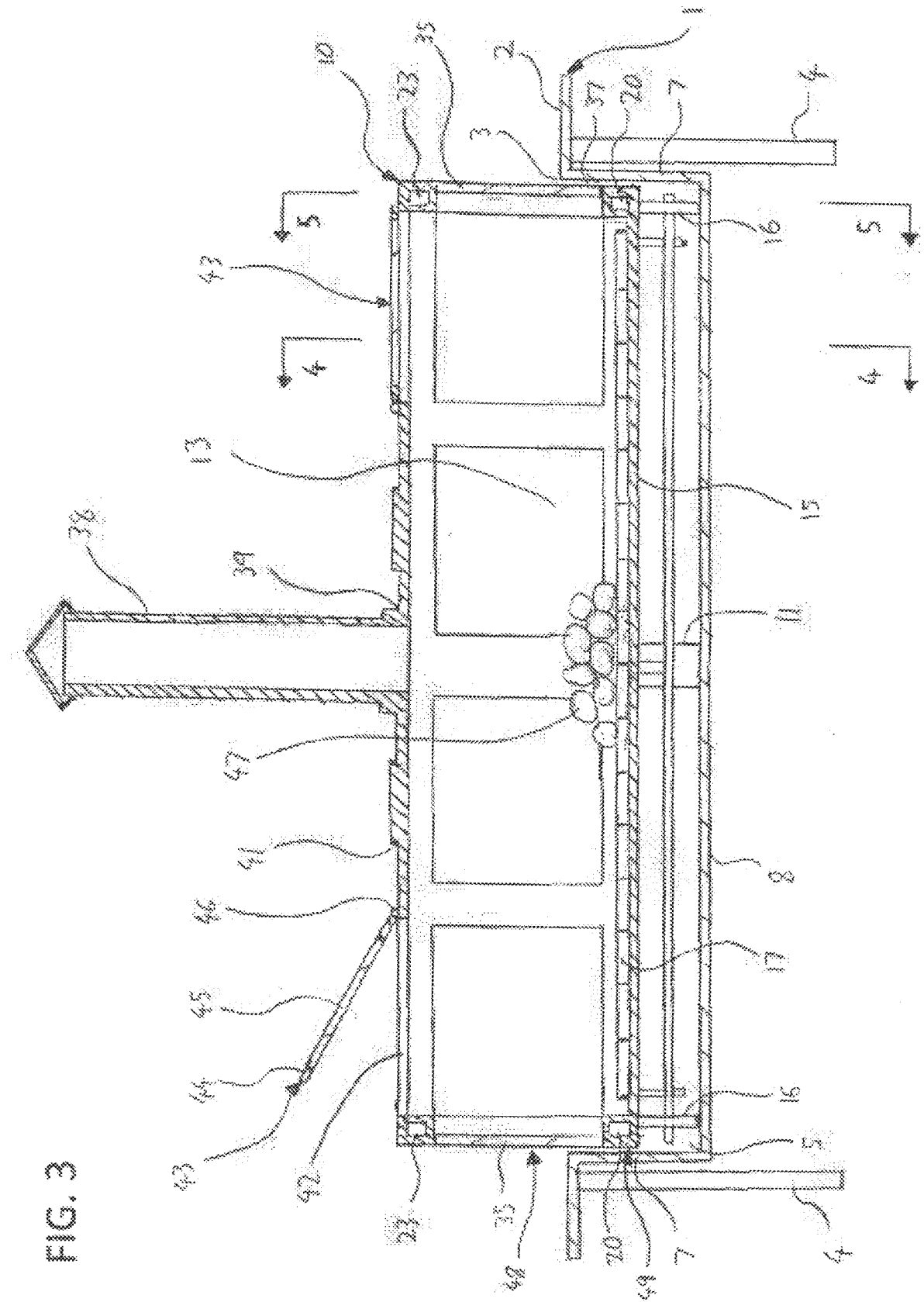
Figure 4:
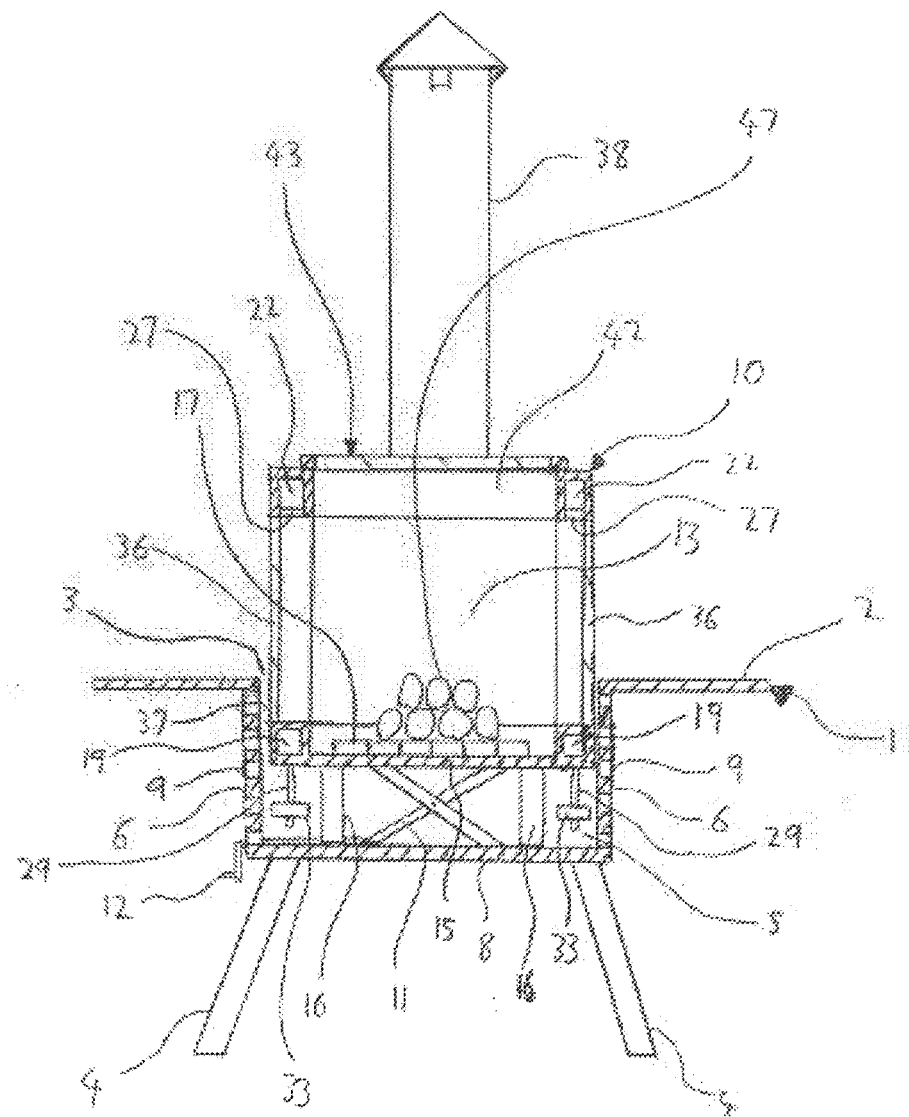
FIGS. 4 and 5 are sectional view taken along lines 4-4 and 5-5, respectively, of FIGS. 2 and 3.
Figure 5:
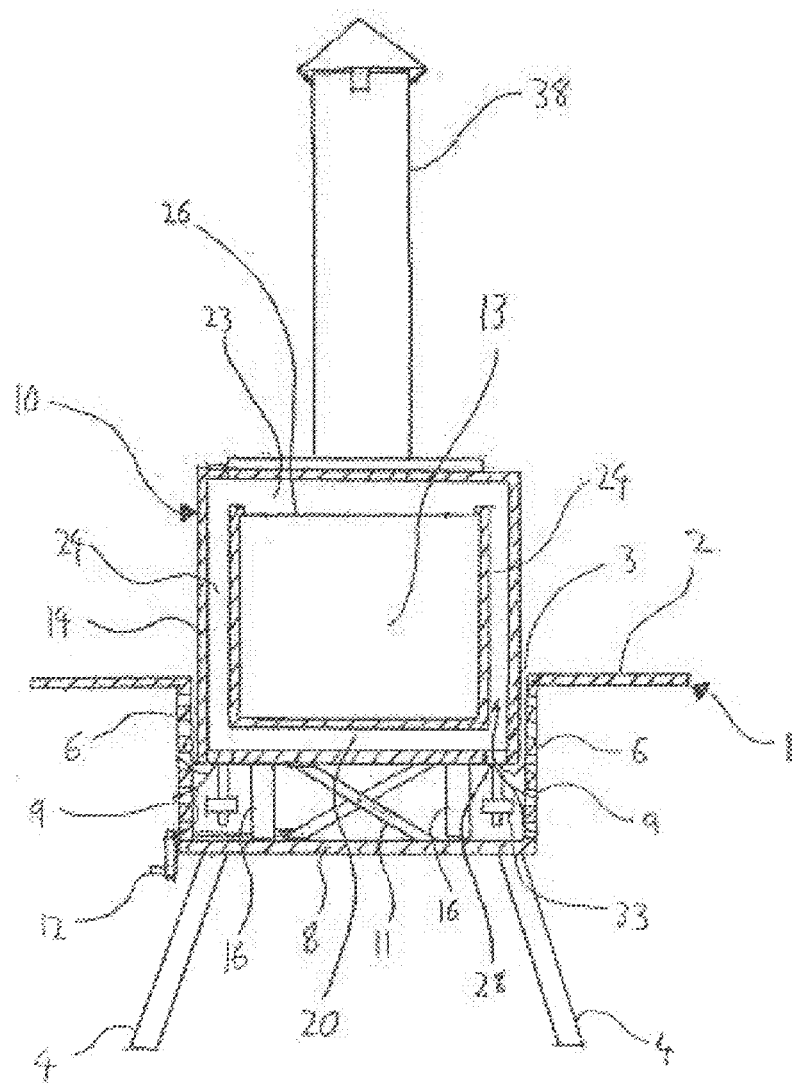
Figure 6:
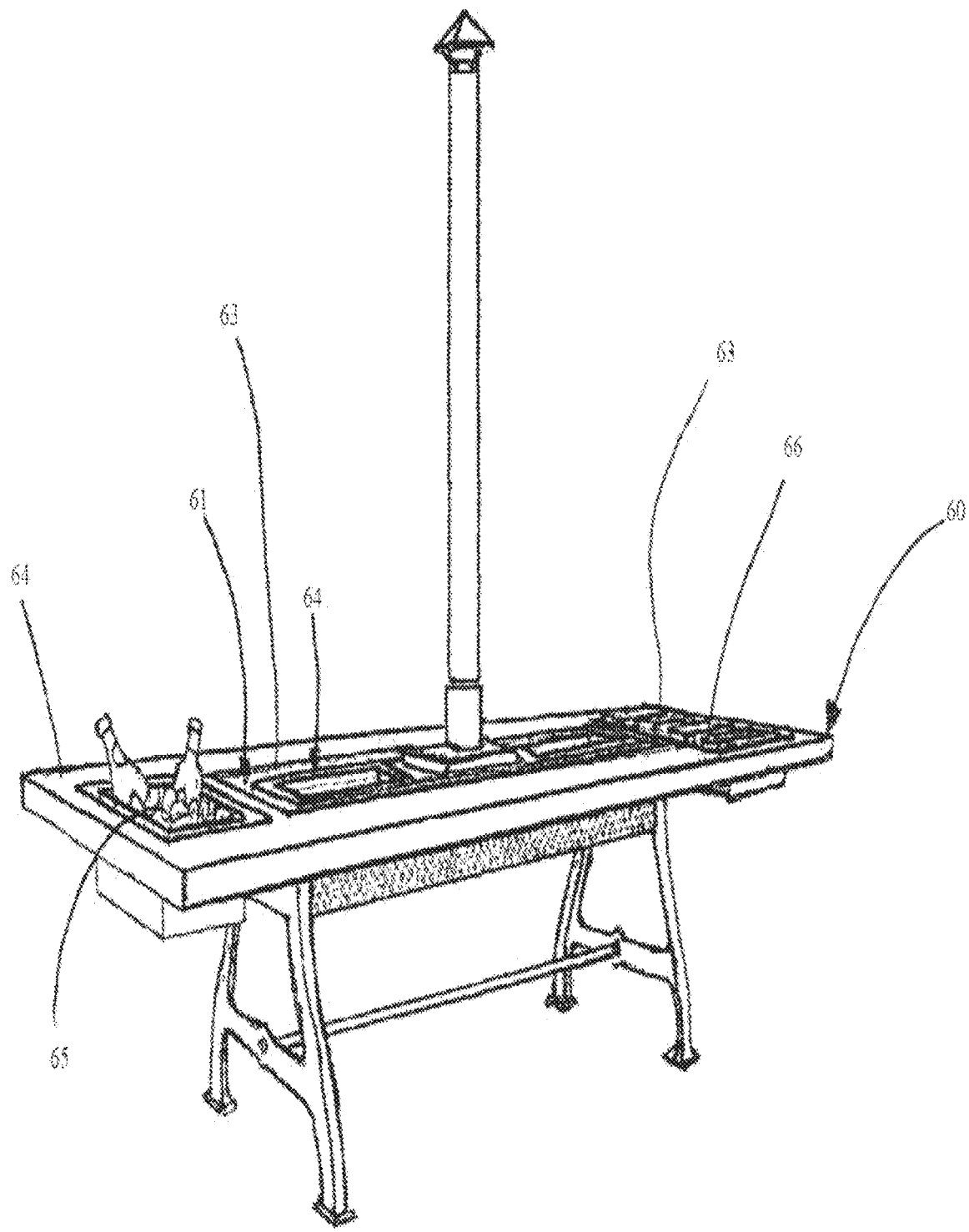
FIG. 6 is a perspective view of a modified table.

Heat generated by the combusting fuel in the chamber 13 also heats the hot plates 41 and food can be placed on them to be cooked. A modified table 60 with a heating appliance 61 is illustrated in FIG. 6 wherein the heating appliance 61 has been fully lowered into the recess 62 so that the top of the chamber frame 63 of the heating appliance 61 is flush with an upper surface of the table top 64. The heating appliance 61 though does not have hot plates. The table top 64 has a cavity 65 at one end for holding bottles and another cavity 66 at the opposite end.

Figure 7:
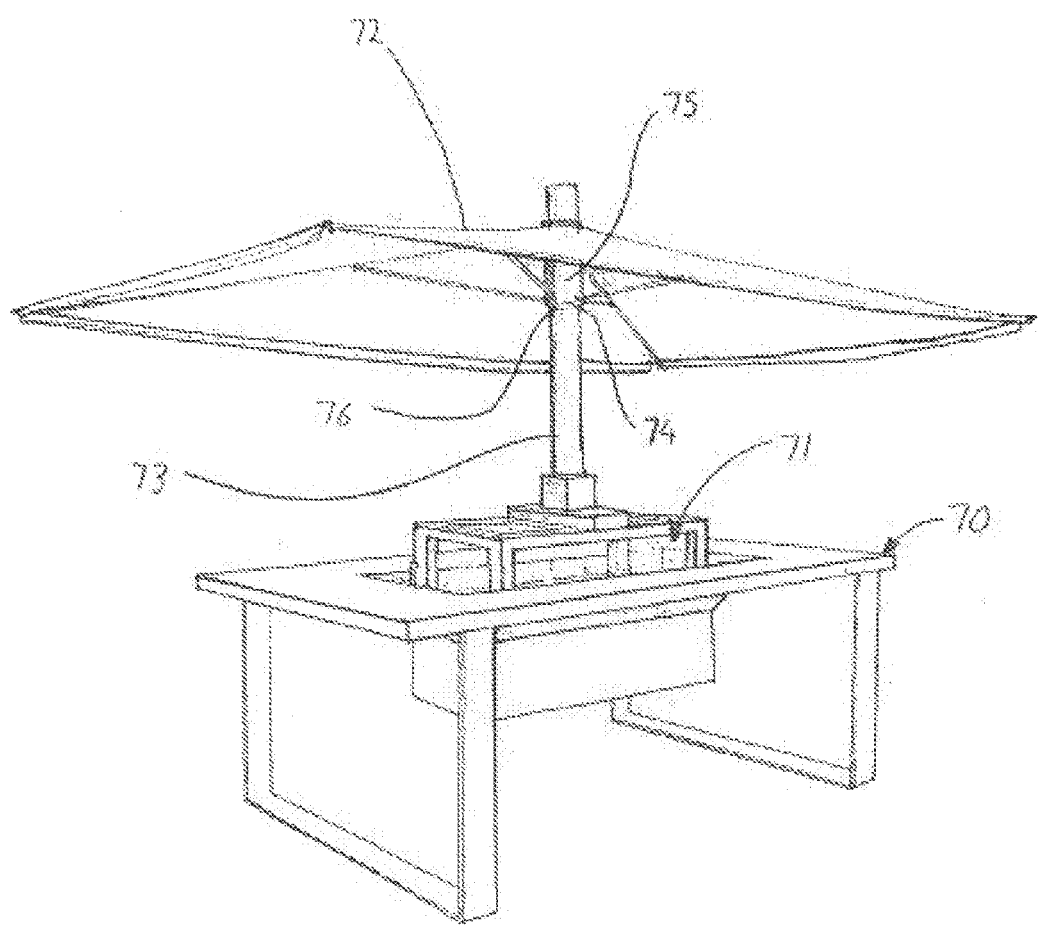
FIG. 7 is a perspective view of another modified table.

Another modified table 70 with a heating appliance 71 is illustrated in FIG. 7 wherein a parasol 72 is supported by the flue exhaust 73. In the vicinity of the parasol 72, the outside of the flue exhaust 73 has heat insulation material 74, and the portion of the parasol 72 adjacent the flue exhaust 73 also has heat insulation material 75 to protect the parasol 72 when the flue exhaust 73 is in use. The flue exhaust 73 has an annular flange 76 which supports the parasol 72.

Figure 8:
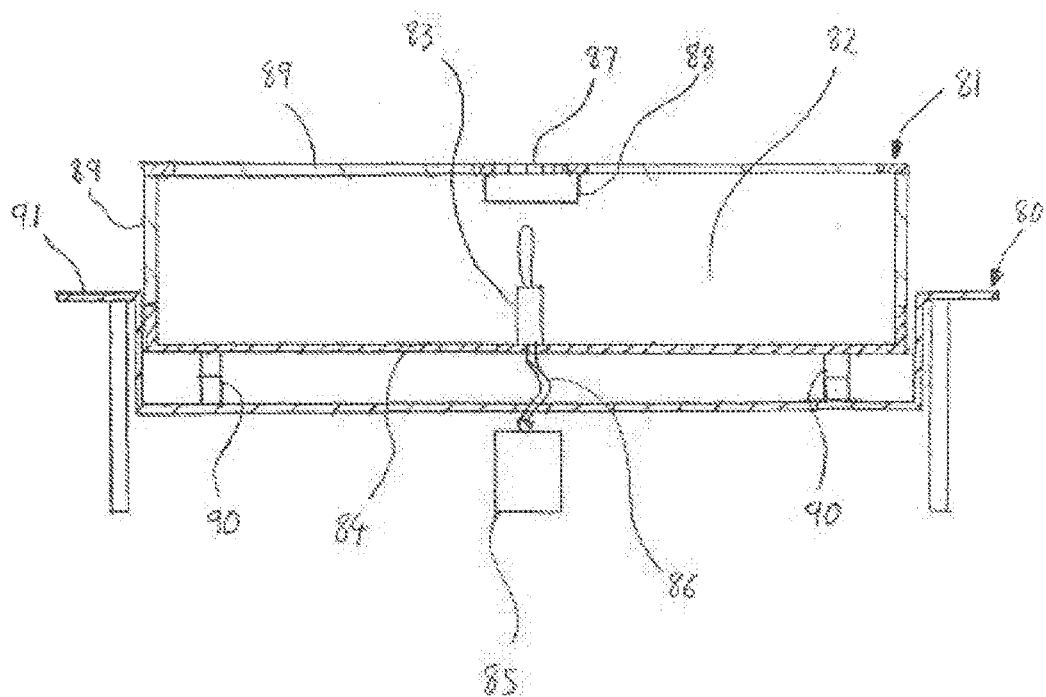
FIG. 8 is a sectional view similar to FIG. 3 of yet another modified table.

Another modified table 80 with a heating appliance 81 is illustrated in FIG. 8 wherein the chamber 82 of the heating appliance 81 no longer has a bed of fire bricks for receiving combustible fuel but instead has a burner or emitter 83 mounted on the chamber base 84 for emitting combustible fuel in the form of gas. The gas burner 83 is connected to a gas canister 85 beneath the table 80 via a hose 86. Controls (not shown) are provided to control the amount of gas emitted by the burner 83 and to ignite the gas. The top of the chamber 82 has an exhaust vent 87 wherein emissions enter the exhaust vent 87 via a catalytic converter 88. The chamber 82 has heat reflective windows 89 in its side and in its top but it does not have frame conduits. The table 80 has a pair of scissor jacks 90 to raise or lower the heating appliance 81 relative to the table top 91.

Figure 9:
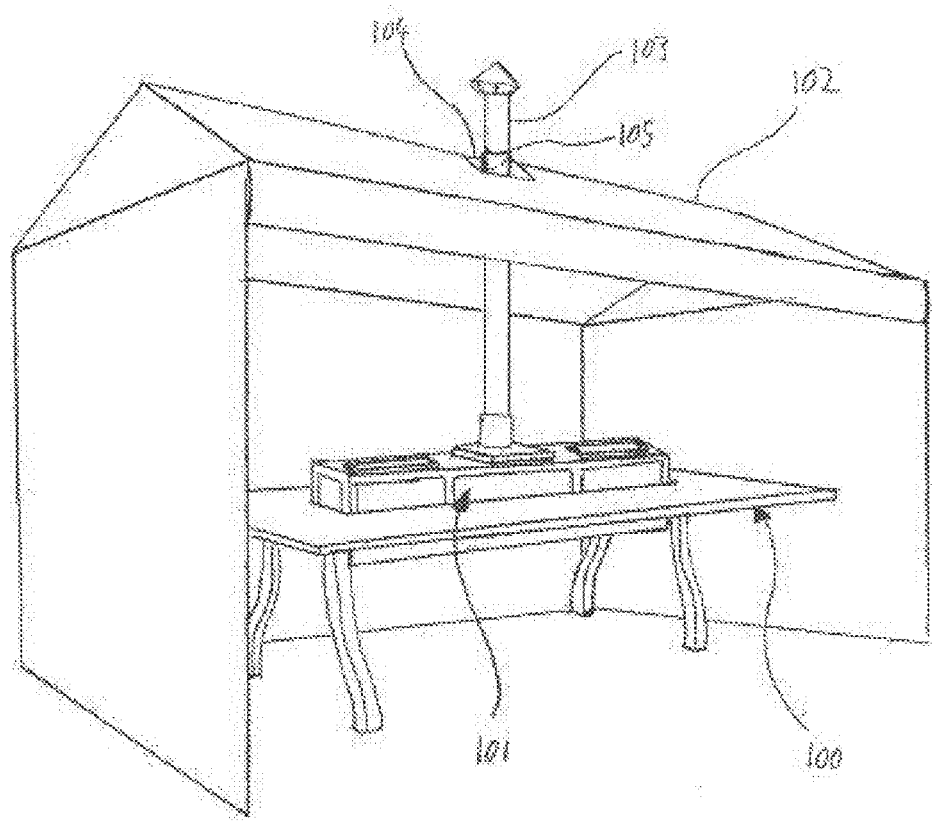
FIG. 9 is a view of a table according to an embodiment of the invention in a tent.
Figure 10:
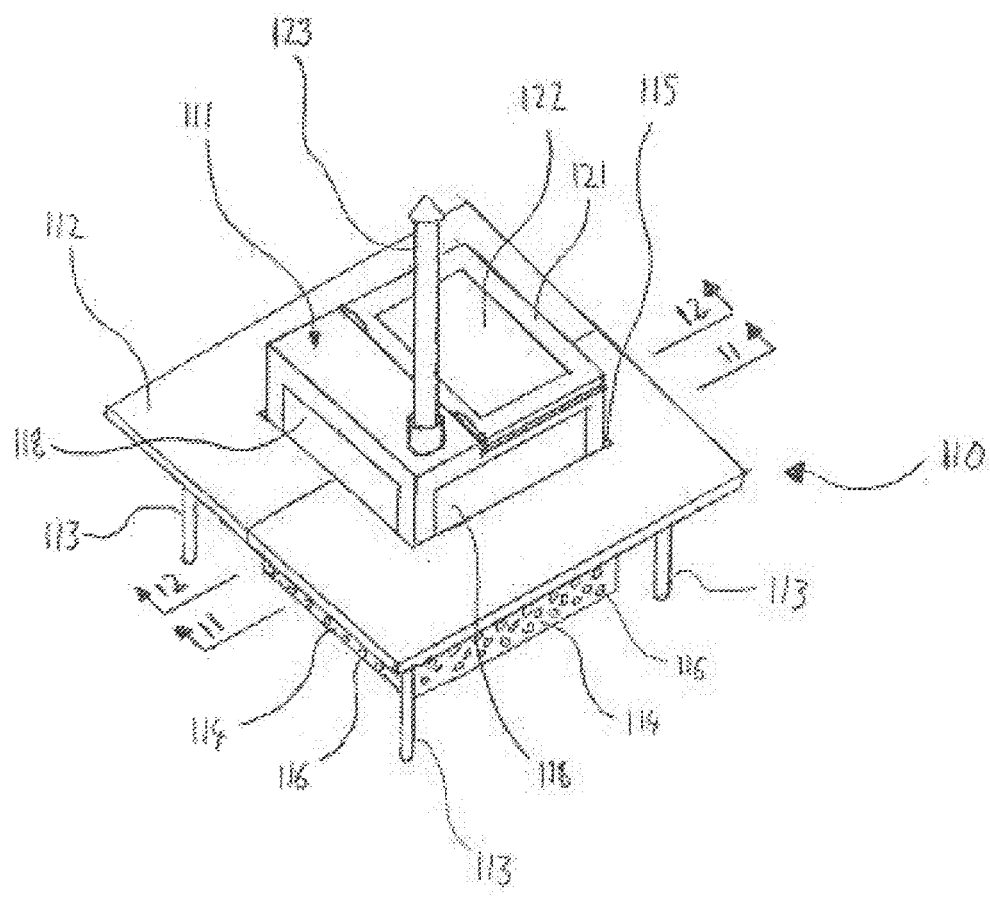
FIG. 10 is a perspective view of a table according to a further embodiment of the invention.
Figure 11:
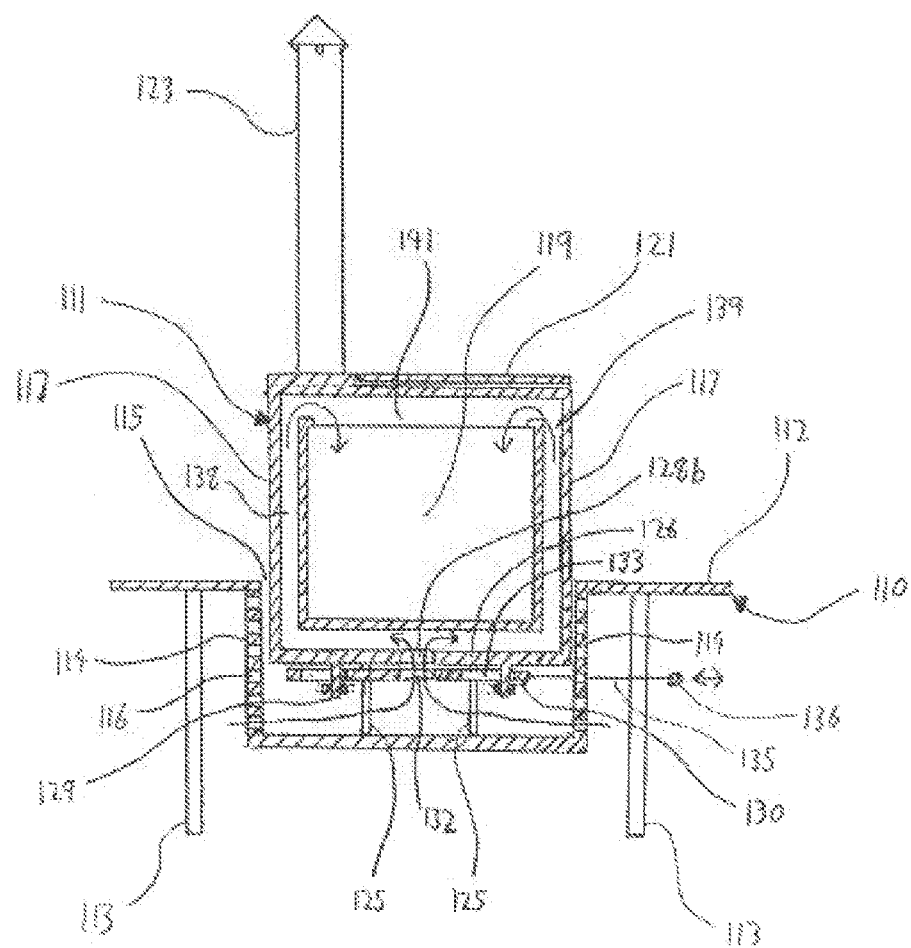
FIGS. 11 and 12 are sectional view taken along lines 11-11 and 12-12, respectively, of FIG. 10.
Figure 12:
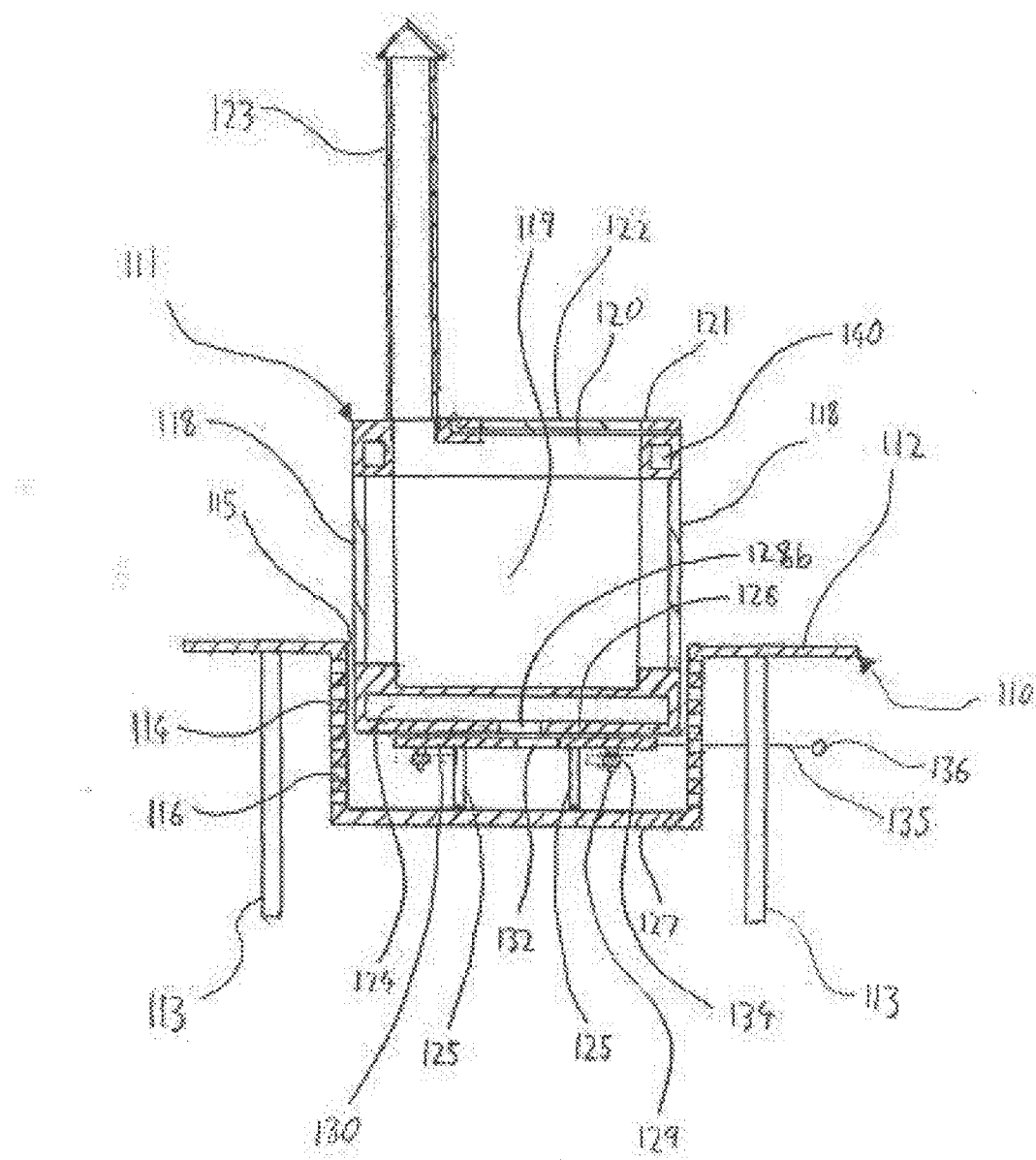
Figure 13:
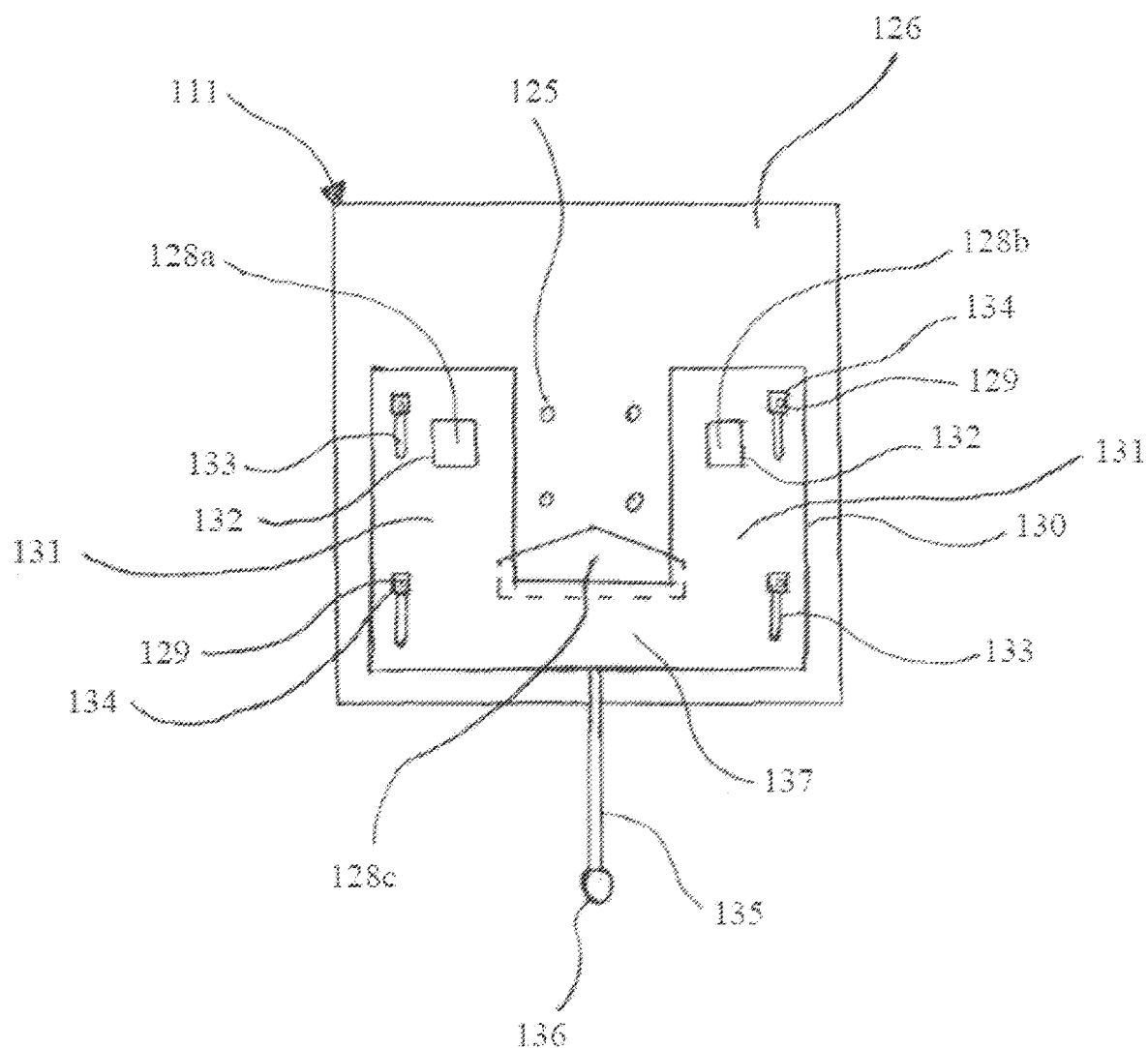
FIG. 13 is a view of the underside of a heating appliance of the table of FIGS. 10 to 12.
Figure 14:
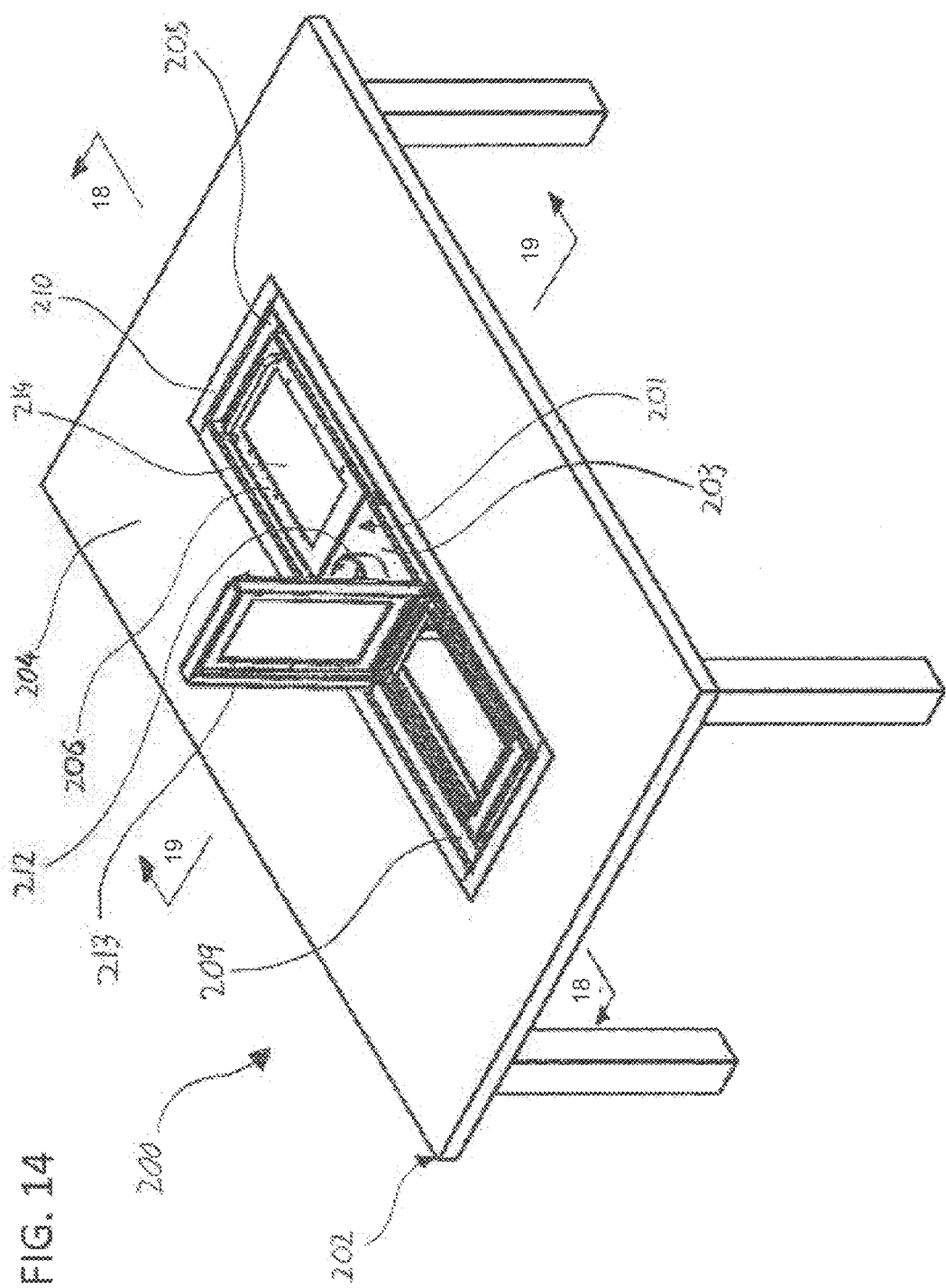
FIG. 14 is a perspective view of yet another modified table.
Figure 15:
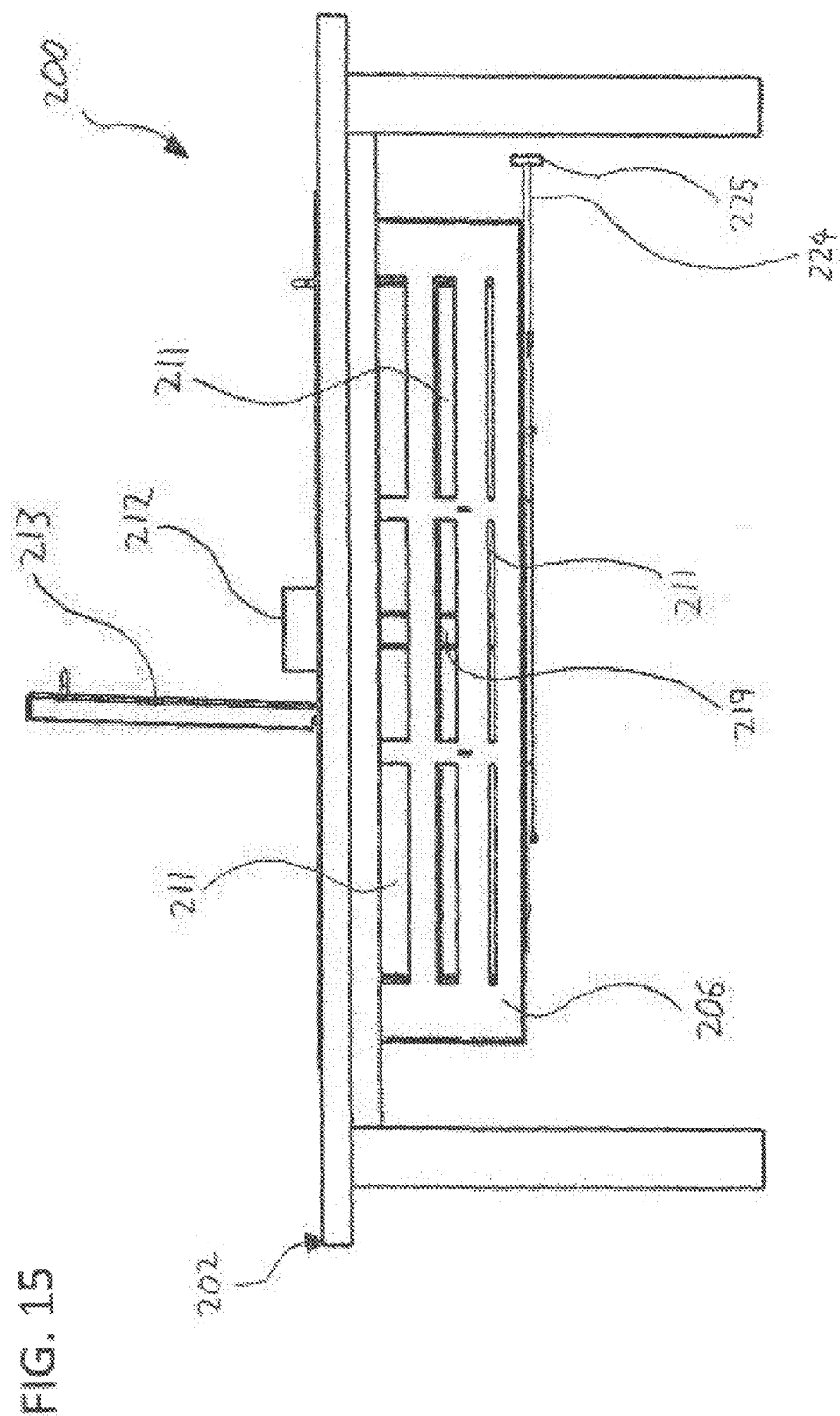
FIG. 15 is a side view of the table of FIG. 14.
Figure 16:
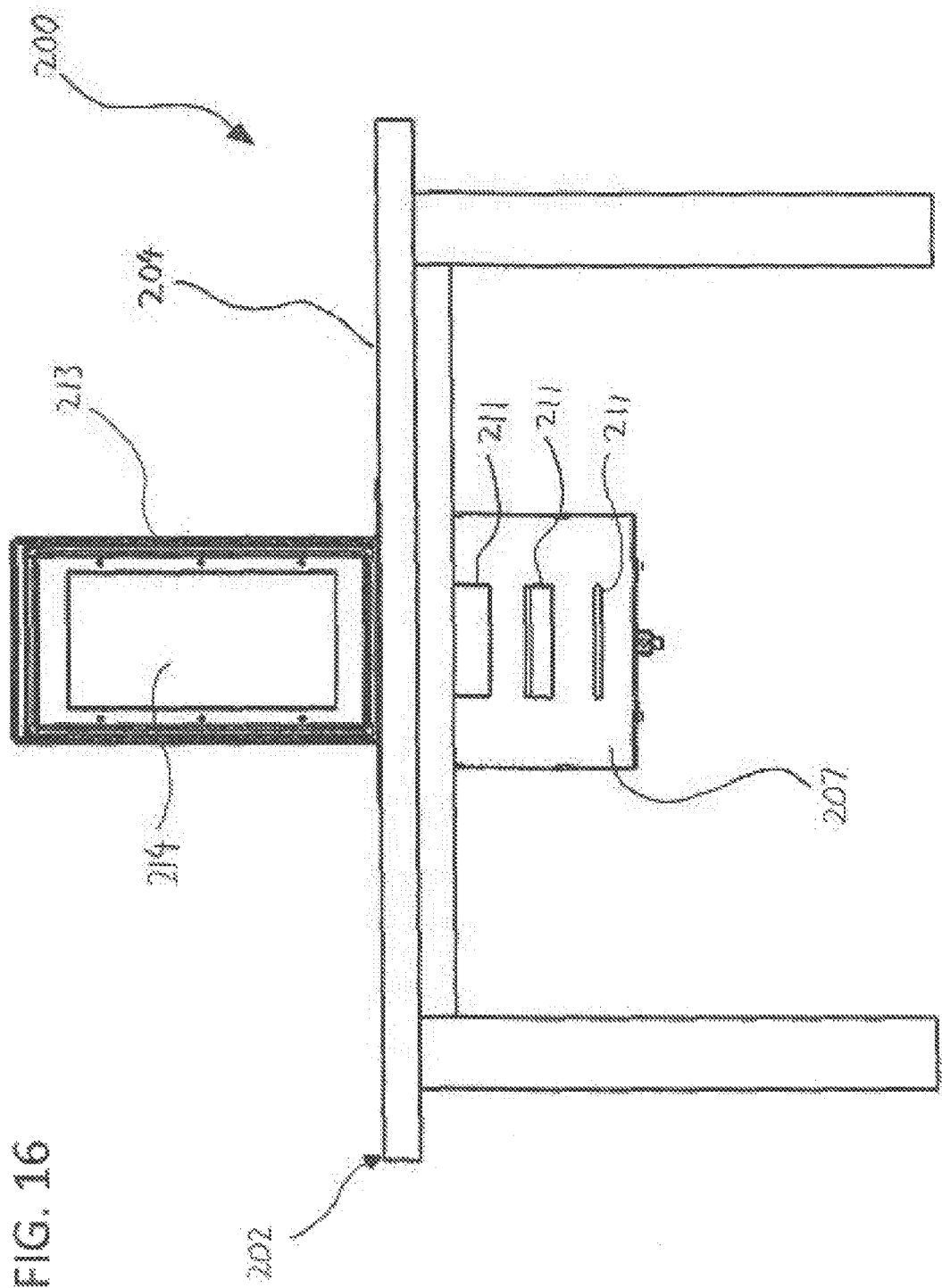
FIG. 16 is an end view of the table of FIG. 14.
Figure 17:
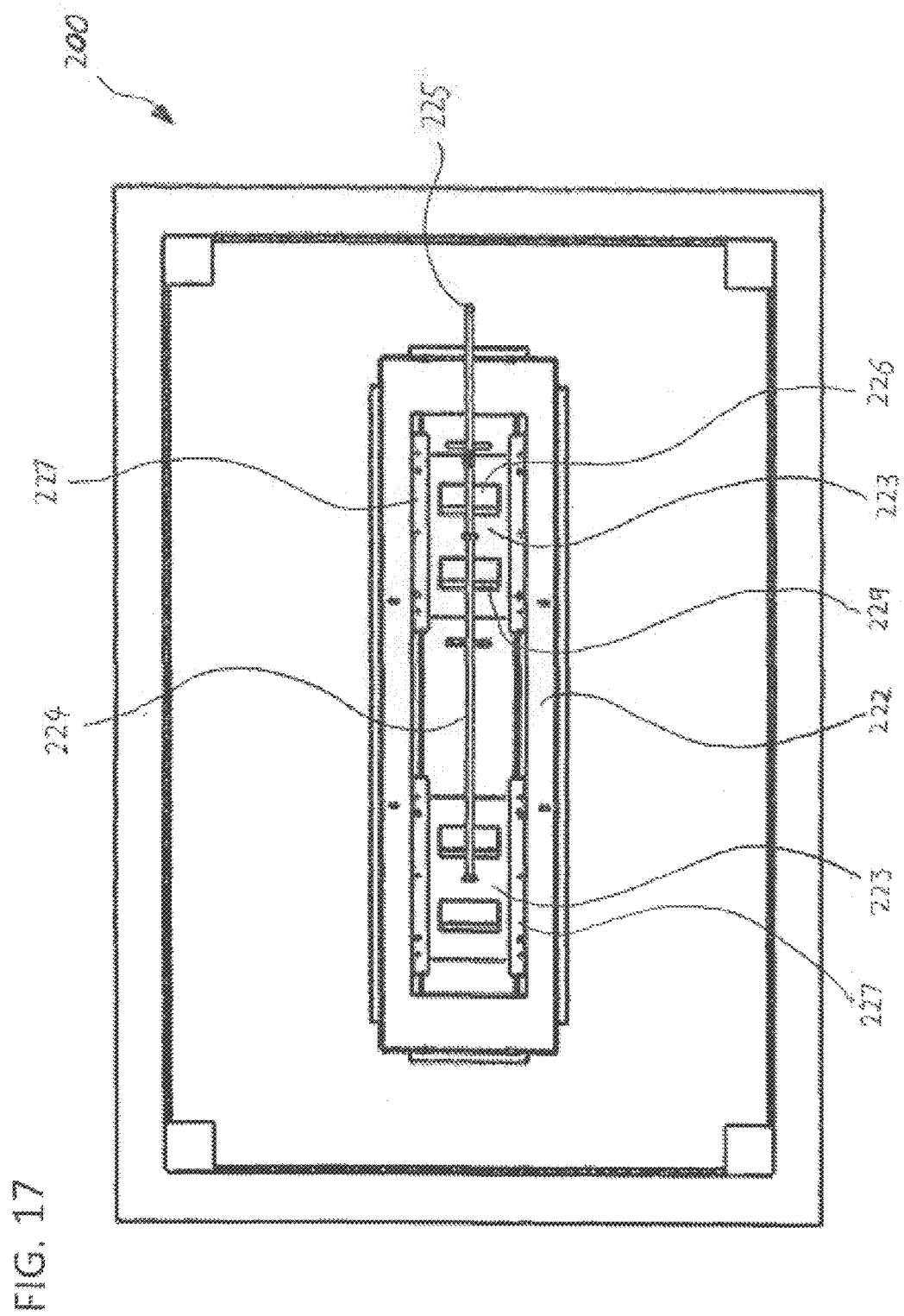
FIG. 17 is an underside view of the table of FIG. 14.
Figure 18:
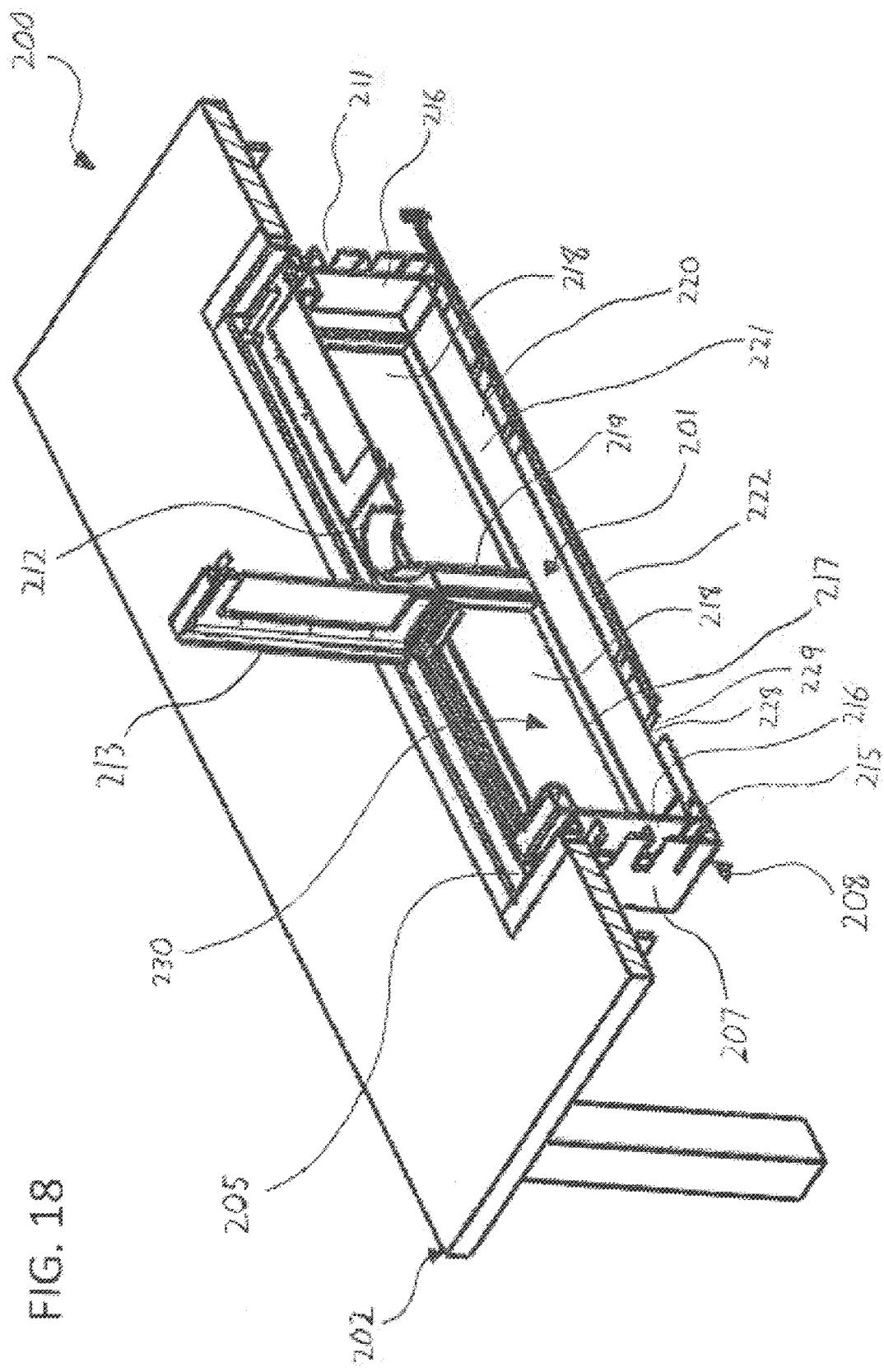
FIGS. 18 and 19 are isometric sectional views taken along lines 18-18 and 19-19, respectively, of FIG. 10.
Figure 19:
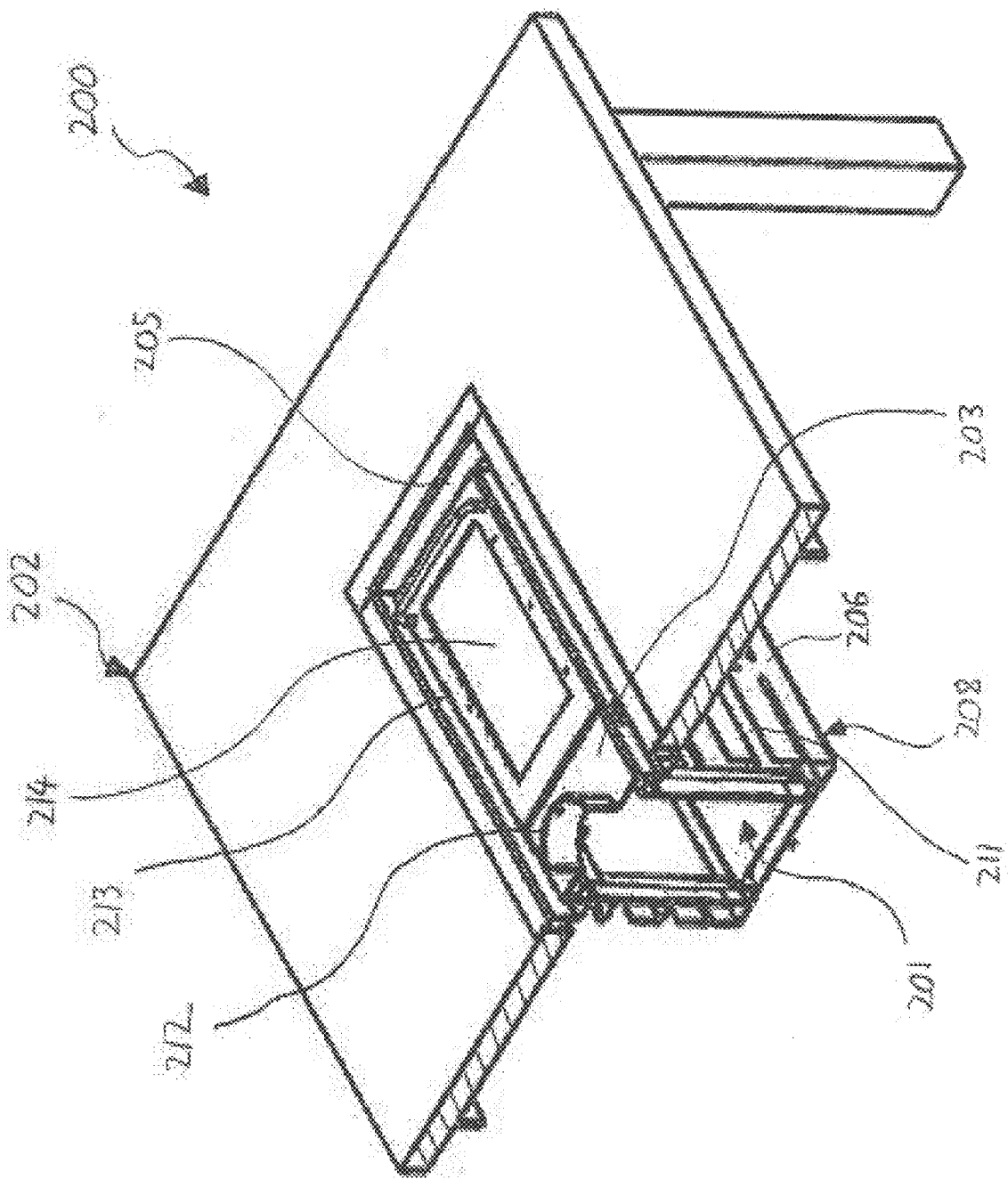

Referring to FIG. 9, a table 100 with a heating appliance 101 is shown located in a tent 102 wherein the flue exhaust 103 extends through an opening 104 in the tent 102. The outside 105 of the flue exhaust 103 in the vicinity of the tent 102 has heat insulation material to protect the tent 102 when the flue exhaust 103 is in use. Another modified table 110 with a heating appliance 111 is illustrated in FIGS. 10 to 13. The table top 112 can be folded in half for transportation, and has legs 113 for supporting the table top 112 which are removable. The table top 112 and heating appliance 111 are substantially square in plan. The four side walls 114 of the table recess 115 all have a plurality of apertures 116.

The heating appliance 11 1 has four side walls 117 wherein each side wall 117 contains a single pane of heat reflective glass 118. The chamber 119 of the heating appliance 111 for containing combustible fuel has a single opening 120 closed by a door 121. The pane of glass 122 in the door 121 may be replaced by a hot plate. The flue exhaust 123 is adjacent one corner of an upper surface of the chamber 119.

Beneath the combusting or main chamber 119 is a plenum chamber 124 and four supporting legs 125 extend from the base 126 of the plenum chamber 124 to rest on the base 127 of the recess 115 of the table 110. The plenum chamber base 126 has three air inlet entrance apertures 128a, 128b, 128c spaced around the supporting legs 125 and two pairs of threaded pins 129. A U-shaped plate 130 is positioned underneath the plenum chamber base 126 and around the supporting legs 125, and each leg 131 of the plate 130 has an aperture 132. The U-shaped plate 130 has two pairs of slots 133 wherein each slot 133 receives a respective one of the pins 129 and each pin 129 has a nut 134 screwed onto it on which the plate 130 rests. The U-shaped plate 130 has a shaft 135 attached to it which extends through one of the side walls 114 of the table recess 115 and has a handle 36 at a distal end. The handle 136 enables the plate 130 to be slid relative to the plenum chamber base 126 so that the plate 130 forms a control valve for the air inlet entrance apertures 128a, 128b, 128c. When the valve is fully opened, each leg aperture 132 of the U-shaped plate 130 is aligned with one of the first two air inlet entrance apertures 128a, 128b, and the portion 137 of the U-shaped plate 130 connecting the legs 131 of the plate 130 is to one side of a third one of the air inlet entrance apertures. The plenum chamber 124 is connected to the four conduit columns 138 of the chamber frame 139 wherein the conduit columns 138 are connected to the upper annular conduit 140.

In use, air passes through the apertures 116 in the recess side walls 114 and enters the chamber frame 139 via the air inlet entrance apertures 128a, 128b, 128c of the plenum chamber 124 and leaves the frame 139 by exit slots 141 in the underside of the upper annular conduit 140 to enable combustible fuel in the main chamber 119 to combust or burn.

The amount of heat radiated from fuel combusting in the chamber 119 can be controlled by using the handle 136 to slide the U-shaped plate 130. If the air inlets 128a, 128b, 128c are to be closed then handle 136 is pushed in as far it can go causing the legs 131 of the plate 130 to cover the first two air inlet entrance apertures 128a, 128b and the portion 137 connecting the legs 131 to cover the third air inlet entrance aperture 128c.

The table 110 illustrated in FIGS. 10 to 13 does not have scissors jacks but these could easily be included.

A modification of the table 110 and heating appliance 111 illustrated in FIGS. 10 to 13 is shown in FIGS. 14 to 19, and the flue exhaust has been omitted for clarity.

The table top 202 of the modified table 200 and the heating appliance 201 are substantially rectangular in plan. A top surface 203 of the heating appliance 201 is flush with an upper surface 204 of the table top 202. There is an air gap 205 between the heating appliance 201 and the walls 206, 207 of the table recess 208. The walls 206, 207 of the table recess 208 extend downwardly through a central opening 209 in the table top 202 from an annular flange 210 that extends outwardly to sit on the upper surface 204 of the table top 202. The walls 206, 207 of the table recess 208 have slots or apertures 211.

A flue base 212 is centrally positioned in the top surface 203 of the heating appliance 201 between a pair of doors 213 wherein each door 213 has a pane of glass 214. Each end 215 of the heating appliance 201 has a single pane of glass 216 and each side 217 of the heating appliance 201 has a pair of panes of glass 218 separated by a central conduit column 219. The base 220 of the plenum chamber 221 of the heating appliance 201 sits on the base 222 of the table recess 208.

A pair of rectangular plates 223 connected by a central shaft 224 is positioned under the table recess base 222 and the shaft 224 extends beyond the plates 223 at one end and has a handle 225 at that end. The plates 223 have apertures 226 and are held by L-shaped members 227 extending from the underside of the table recess base 222. The handle 225 enables the plates 223 to be slid relative to the table recess base 222 so that the apertures 226 in the plates 223 enable the plates 223 to form a control valve for air inlet entrance apertures 228 in the plenum chamber base 220 which are aligned with apertures 229 in the table recess base 222.

In use, flames from combusting fuel in the main chamber 230 of the heating appliance 201 may be seen through the door panes 214. The flames may also be seen through the end panes 216 and side panes 218 via the slots 211 in the walls 206, 207 of the table recess 208.

Whilst particular embodiments have been described, it will be understood that various modifications may be made without departing from the scope of the claimed invention. The legs of the table may have adjustable feet for levelling. Instead of a scissor jack, any other suitable mechanism may be used to raise or lower the heating appliance relative to the table top.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A cooking system comprising:
   a heating apparatus comprising a recessed combustion chamber for receiving a combustible fuel, the recessed combustion chamber comprising a floor and an opening;
   a cooking surface comprising a planar surface substantially parallel to the floor, an aperture in the planar surface, and two opposing friction members;
   a friction rod having a distal end near the floor and a proximate end near the opening, the friction rod passing through the aperture and between the two opposing friction members;
   wherein friction between the friction rod and the friction members holds the cooking surface above and substantially parallel to the floor, and
   wherein canting a portion of the cooking surface toward the opening reduces the friction between the friction rod and the friction members such that the cooking surface can be raised or lowered relative to the floor.

2. The cooking system of claim 1, wherein the cooking surface is only in contact with the heating apparatus via the friction rod.

3. The cooking system of claim 1, wherein the friction between the rod and friction members is induced by the weight of the cooking surface.

4. The cooking system of claim 1, wherein the friction members do not extend beyond a perimeter of the cooking surface.

5. The cooking system of claim 1, wherein the friction rod has a circular cross section and the friction members each comprise a semi-circular portion in which the friction rod frictionally engages the friction members.

6. The cooking system of claim 1, wherein the friction members comprise a first and second friction member, and the first friction member is disposed above and towards the opening relative to the second friction member.

7. The cooking system of claim 6, wherein the second friction member is disposed within the aperture.

8. The cooking system of claim 6, wherein the second friction member is disposed below the planar surface.

9. The cooking system of claim 6, wherein the cooking surface further comprises one or more surfaces perpendicular to the planar surface, that are affixed to a perimeter of the planar surface and extend vertically towards the opening.

10. The cooking system of claim 9, wherein the first friction member is affixed to the surface perpendicular to the planar surface.

11. The cooking system of claim 1, wherein one or more of the friction members and friction rod comprise a textured surface.

12. The cooking system of claim 1, wherein the friction rod comprises one or more notches operable to associate with at least one of the friction members to position the cooking surface at one or more preset heights relative to the floor.

13. The cooking system of claim 1, wherein the cooking surface comprises a second aperture, the system further comprising a second friction rod having a distal end near the floor and a proximate end near the opening, the second friction rod passing through the second aperture.

14. The cooking system of claim 1, further comprising a handle operably associated with the cooking surface.

15. The cooking system of claim 14, wherein the handle is coupled to the cooking surface.

16. The cooking system of claim 14, wherein the handle is operably associated with the cooking surface to perform the canting of the cooking surface toward the opening.

17. The cooking system of claim 16, wherein the handle is further operably associated with the cooking surface to raise the cooking surface, relative to the floor, along the friction rod.

18. The cooking system of claim 1, wherein the heating apparatus further comprises a lid operable to cover at least a portion of the opening.

19. The cooking system of claim 1, wherein the heating apparatus further comprises a catalytic converter for reducing emissions from the combustion chamber.

20. The cooking system of claim 1, wherein said heating appliance includes an air inlet for supplying air to an inside of said chamber for combusting said combustible fuel.

* * * * *